US008578059B2

(12) United States Patent
Odayappan et al.

(10) Patent No.: US 8,578,059 B2
(45) Date of Patent: Nov. 5, 2013

(54) DEPLOYING A CONFIGURATION FOR MULTIPLE FIELD DEVICES

(75) Inventors: Jayamani Odayappan, Mansfield, MA (US); Johan Ingemar Tegnell, Mansfield, MA (US); Charles Wilson Piper, Foxboro, MA (US); Vladimir Dimitrov Kostadinov, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 534 days.

(21) Appl. No.: 12/697,901

(22) Filed: Feb. 1, 2010

(65) Prior Publication Data

US 2011/0191500 A1 Aug. 4, 2011

(51) Int. Cl.
*G06F 3/00* (2006.01)
*G06F 13/00* (2006.01)
*G06F 5/00* (2006.01)

(52) U.S. Cl.
USPC .................. 710/8; 710/33; 710/38; 710/52

(58) Field of Classification Search
None
See application file for complete search history.

(56) References Cited

U.S. PATENT DOCUMENTS

| 7,093,244 | B2* | 8/2006 | Lajoie et al. | 717/168 |
| 7,848,827 | B2* | 12/2010 | Chen | 700/19 |
| 2005/0259649 | A1* | 11/2005 | Smith | 370/389 |
| 2007/0079250 | A1* | 4/2007 | Bump et al. | 715/762 |
| 2007/0240071 | A1* | 10/2007 | Sherrill et al. | 715/764 |
| 2007/0250180 | A1* | 10/2007 | Bump et al. | 700/1 |
| 2008/0189638 | A1* | 8/2008 | Mody et al. | 715/771 |
| 2009/0327942 | A1* | 12/2009 | Eldridge et al. | 715/771 |
| 2010/0082132 | A1* | 4/2010 | Marruchella et al. | 700/86 |

OTHER PUBLICATIONS

FCP270 Specification, Invesys Process Systems, 2004.*

* cited by examiner

*Primary Examiner* — Kris Rhu
(74) *Attorney, Agent, or Firm* — Edward S. Jarmolowicz

(57) ABSTRACT

A method and system are disclosed for deploying a configuration in a process control system wherein at least a portion of the configuration is deployed to a set of field devices. Initially the set of deployment packages are stored within a configuration storage. Thereafter, deployment is initiated on the set of deployment packages from the configuration storage. In response to the initiating deployment step, an automated cascaded deployment is commenced to the set of connected field devices. The automated cascaded deployment includes first deploying the sets of deployment packages to a set of control module assemblies. The method furthermore includes second deploying the received portions of the set of deployment packages to a set of I/O module assemblies. The set of I/O module assemblies maintain and pass the received sub-portions of the set of deployment packages to sets of field devices.

19 Claims, 14 Drawing Sheets

| Application Parameters | Sequence | Conditions (E.g. MODE) | Delay for Processing in Device |
|---|---|---|---|
| Input Upper Range | 3 | OOS | 0 sec. |
| Input Lower Range | 4 | OOS | 0 sec. |
| Input Units | 2 | OOS | 0.2 sec. |
| Gain | 8 | Any | 0 sec. |
| Output Upper Range | 6 | OOS | 0 sec. |
| Output Lower Range | 7 | OOS | 0 sec. |
| Output Units | 5 | OOS | 0.7 sec. |
| Linearization type | 1 | OOS | 0 sec. |

FIG. 7

DEPLOYING A CONFIGURATION FOR MULTIPLE FIELD DEVICES

FIELD OF THE INVENTION

This invention relates generally to networked computerized industrial process control systems and, more particularly, relates to particular process control systems with field devices such as transmitters, valves, positioners, etc. More particularly, the present invention relates to a process control network including one or more buses including a set of field devices. An example of such a bus is a Fieldbus Foundation H1 link including a set of Fieldbus devices executing one or more of a variety of "device block" types including function, transducer, and resource device block types—also generally referred to herein simply as "blocks." It is further noted the invention is not limited to Fieldbus Foundation and instead is intended to encompass a variety of distributed process control systems/protocol types.

BACKGROUND

Industry increasingly depends upon highly automated distributed data acquisition and control systems to ensure that industrial processes are run efficiently, safely and reliably while lowering their overall production costs. A number of sensors measure aspects of an industrial process and periodically report their measurements back to data collection and/or control systems. Such measurements come in a wide variety of forms and are used by industrial process control systems to regulate a variety of operations, both with respect to continuous and discrete manufacturing processes. By way of example the measurements produced by a sensor/recorder include: a temperature, a pressure, a pH, a mass/volume flow of material, a quantity of bottles filled per hour, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as adjust a valve position, or even move equipment into and out of service as required.

Typical industrial processes today are extremely complex and comprise many intelligent devices such as transmitters, positioners, motor drives, limit switches and other communication enabled devices. By way of example, it is not unheard of to have large projects having tens of thousands of sensors and control elements (e.g., valve actuators) monitoring/controlling aspects of a multi-stage process within an industrial plant.

As field devices have become more advanced over time, the process of setting up, performing diagnostics, and maintaining field devices for use in particular installations has also increased in complexity.

In previous generations of industrial process control equipment, and more particularly field devices, transmitters and positioners were comparatively simple components.

More contemporary field devices include digital data transmitting capabilities and on-device digital processors, referred to generally as "intelligent" field devices. Such devices generally support an extensive set of parameters for providing a variety of status, diagnostic and process variable values.

A particular type of intelligent field device incorporates the Fieldbus Foundation (or Fieldbus) protocol/architecture. In process control systems that embody the Fieldbus protocol, the individual field devices possess the capability to executing a control program distributed across multiple components in the form of device blocks (e.g., function blocks). The Fieldbus protocol/architecture thus facilitates executing control logic in the field devices themselves rather than relying upon control logic executed in higher level process control components (e.g., control processors executing compounds containing sets of cyclically sequentially executed function blocks).

In known Fieldbus systems, blocks are serially deployed from a configuration, maintained by the application database, on a block-by-block basis to devices within which the particular blocks are ultimately executed. In complex systems, where multiple Fieldbus field devices are connected to a single control module assembly (e.g., Invensys CP 270) via one or more I/O module assemblies, blocks are deployed and connected to the process control infrastructure one block at a time. The deployment of blocks in such systems can take several seconds to minutes since each block typically contains several parameter values to be written during deployment/commissioning. In the case where many Fieldbus devices, executing potentially hundreds of blocks, are connected to a single control module assembly (e.g., INVENSYS' CP 270) via potentially several I/O module assemblies (e.g. INVENSYS' FBM 228), deploying the configurations (e.g., defined control blocks, setup scripts, etc.) to the field devices and connecting the device blocks executed in Fieldbus devices to the control infrastructure to facilitate a configured distributed process control environment can result in substantial delays (e.g., hours). Thus, a more time-efficient process/procedure is needed to deploy field device configurations, including defined device blocks that are distributed to particular ones of the field devices, to the field devices in such highly distributed process control environments.

SUMMARY OF THE INVENTION

In view of the above, a method and system are described herein that support/execute deploying a set of deployment packages, corresponding to a configuration for a process control system, to a set of connected field devices. The system and method incorporate the following summarized steps. Initially the set of deployment packages are stored within a configuration storage. Thereafter, deployment is initiated on the set of deployment packages from the configuration storage. The configuration storage is, for example, on a server or on a workstation. In response to the initiating deployment step, an automated cascaded deployment is commenced, with regard to the set of deployment packages, to the set of connected field devices.

The automated cascaded deployment includes first deploying the sets of deployment packages, to a set of control module assemblies. Thereafter, the set of control module assemblies maintain received portions of the set of deployment packages to facilitate distribution of the received portions of the set of deployment packages to identified field devices.

The method furthermore includes second deploying, in parallel by the control module assemblies, the received portions of the set of deployment packages to a set of I/O module assemblies. The I/O module assemblies are communicatively connected to sets of field devices. The set of I/O module assemblies maintain received sub-portions of the set of deployment packages to facilitate forwarding of the received sub-portions of the set of deployment packages to the communicatively connected sets of field devices. The method furthermore includes third deploying, by the set of I/O module assemblies, the received sub-portions of the set of deployment packages to the communicatively connected sets of field devices.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7 schematically depicts an exemplary set of block parameters and associated configurable deployment characteristics (download sequence, condition—required mode, and delay after write) assigned using an interface of the type depicted, by way of example, in FIG. 6;

DETAILED DESCRIPTION OF THE DRAWINGS

Figure 1:
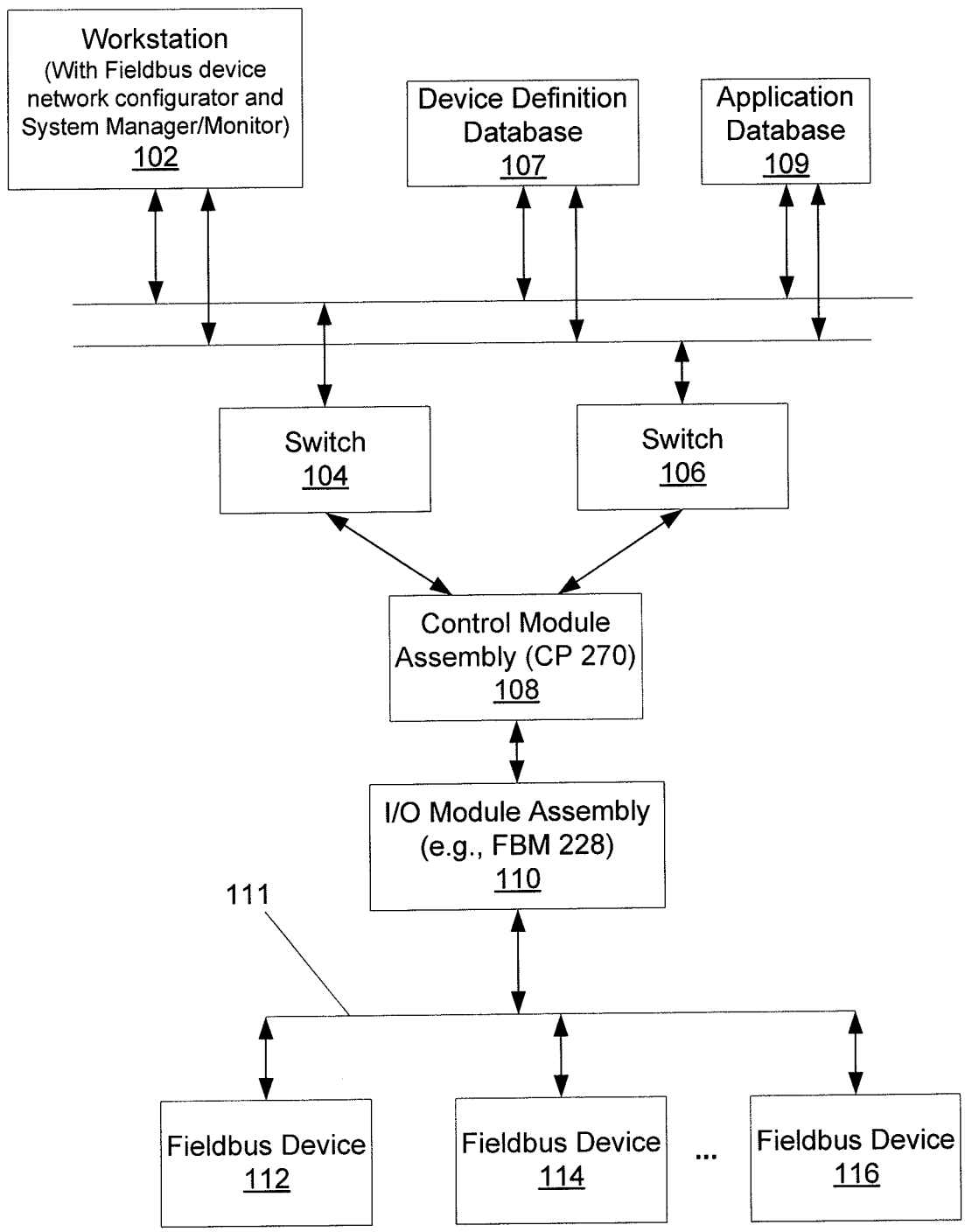
FIG. 1 is schematic diagram depicting a portion of an exemplary process control network environment wherein the present invention is potentially incorporated.

Turning to FIG. 1, an exemplary simplified industrial process control system arrangement/environment is depicted. The illustrative example is intended to show an exemplary network scheme where workstations and database server systems reside on a redundant bus. The workstations and databases provide/receive process control system information via an exemplary path, through a control module 108 (e.g., INVENSYS' CP 270) and an I/O module assembly 110 (e.g., INVENSYS' FBM 228), to a set of Field devices 112, 114 and 116 (e.g., Foundation Fieldbus field devices) connected to a process control device bus 111 (e.g., Foundation Fieldbus H1 link). It is specifically noted that the example is simplified substantially for purposes of illustration. In particular, in practice, the networks comprise: (1) multiple control module assemblies (e.g., control module assembly 108), (2) multiple I/O module assemblies (e.g., I/O module assembly 110) . . . each I/O module assembly being connected to multiple distinct device buses, and (3) several field devices (e.g., FF fieldbus devices 112, 114, and 116) connected to each device bus (e.g., Foundation Fieldbus H1 link). Moreover, in practice the network is likely to include multiple workstations and various other pieces of computer equipment such as servers, backup machines, etc.

A workstation 102, comprising a variety of system configuration and monitoring applications, provides an operator/engineering interface through which an engineer/technician configures and thereafter potentially monitors the components of an industrial process control system including a Fieldbus Foundation H1 bus to which a set of Fieldbus devices are connected. The workstation 102 comprises any of a variety of hardware/operating system platforms. By way of example, the workstation 102 comprises a personal computer running on the MICROSOFT WINDOWS operating system. However, alternative embodiments of the invention can potentially run on any one or more of a variety of operating systems such as: Unix, Linux, Solaris, Mac OS-X, etc.

In accordance with an exemplary embodiment, the workstation 102 hosts a Fieldbus device configuration application and a System manager/monitor application. The configuration application provides access to a database (device definition database 107) for persistent storage of previously defined descriptions of configurable tasks executable by one or more of the devices depicted in FIG. 1. The sets of device blocks executed within components of the system depicted in FIG. 1 are customized via the descriptions rendered by the configuration application executing on workstation 102 and then subsequently downloaded to device block execution components of the illustratively depicted system. In an exemplary embodiment configurations, from which deployment packages are generated and deployed, are stored on the workstation 102 and/or on a shared network configuration database server. Access is also provided to an application database 109 that stores a set of customization/configuration definitions/packages that were previously downloaded to components of the depicted system.

The configuration application running on workstation 102 provides access to a set of templates for specifying customizable device blocks executed by the control module assembly 108, the I/O module assembly 110 (e.g., an INVENSYS field bus module model FBM228), and connected Fieldbus devices 112, 114, and 116.

The configuration application also enables users to define tasks, executed for example on the workstation 102, for processing process/status data generated as a result of execution of the device blocks by the control module assembly 108, the I/O module assembly 110, and Fieldbus devices 112, 114, and 116. It is important to note that the Fieldbus devices 112, 114 and 116 are merely representative of Fieldbus devices that execute tens, hundreds and even thousands of device blocks.

In the illustrative example, the workstation 102, device definition database 107 and application database 109 are connected in a redundant configuration via dual Ethernet interfaces/wiring to redundant switches 104 and 106. The Ethernet switches 104 and 106 are commercially available and provided, for example, by Allied Telesyn (e.g., model AT-8088/ MT). While not specifically depicted in FIG. 1, additional nodes, comprising workstations, servers and other elements (e.g., control module assemblies) of a supervisory portion of the process control system are potentially connected to the redundant switches 104 and 106. In the illustrated embodiment, the device definition database 107 and application database 109 store information regarding types/classes (templates) and instances, respectively, for I/O module assemblies, field devices and device blocks. Furthermore, while hardwired connections between the workstation and switches 104 and 106 via ETHERNET local area network links are depicted in FIG. 1, such links over a local supervisory level process control network are alternatively carried out via wireless network interfaces.

The switches 104 and 106 (as well as potentially other non-depicted switches) are also communicatively coupled to the control module assembly 108. The control module assembly 108 comprises one or more control modules (also referred to as control processors). An illustrative example of the control module assembly 108 is a Foxboro CP model FCP270, by Invensys Systems, Inc. In accordance with various exemplary embodiments, process control functionality is carried out in any of a variety of configurations wherein control logic, embodied within device blocks, are configured, deployed and commissioned on a variety of process control system physical components including: workstations, intelligent transmitters, or virtually any communicatively coupled device capable of executing control logic (e.g., function blocks).

With continued reference to FIG. 1, the I/O module assembly 110, alternatively referred to as a field bus module, is connected to the control module assembly 108. The communications protocol utilized for carrying out communications between the I/O module assembly 110 and control module assembly 108 is potentially any one of a variety of proprietary/non-proprietary communications protocols. In one embodiment, the communications between the control module assembly 108 and I/O module assembly 110 are carried out via a communication bus. While only a single I/O module assembly 110 is depicted in the illustrative example, embodiments of the invention often comprise many I/O module assemblies.

The I/O module assembly 110, in general, includes a variety of interfaces for communicating directly and/or indirectly to a variety of devices attached to the bus 111 (e.g., a Fieldbus Foundation H1 bus). However, alternative embodiments utilize alternative arrangements including, point-to-point (HART), wired and/or wireless links between the I/O module assembly 110 and connected field device. In the illustrative example, the I/O module assembly 110 comprises a Fieldbus I/O module assembly (e.g., an INVENSYS field bus module model FBM228) that supports communications between the control module assembly 108 and the Fieldbus devices 112, 114, and 116. In the illustrative embodiment, the set of representative Fieldbus devices 112, 114 and 116 comprise any of a variety of process parameter transmitters (e.g., pressure, temperature, flow, etc.), positioners, etc. operating at the lowest level of an industrial process control system to measure (transmitters) and control (positioners) plant activity.

In the exemplary embodiment, each Fieldbus device 112, 114, and 116 accumulates values associated with the field device and potentially executes one or more previously installed device blocks (e.g., function blocks). The Fieldbus devices 112, 114 and 116 cyclically execute their device blocks and provide their data to the I/O module Assembly 110 (e.g., FBM228) for further processing.

The I/O module assembly 110, after initially storing the received message in local memory, performs a variety of programmed and asynchronous tasks in response to requests from the control module assembly 108. In an exemplary embodiment, the I/O module assembly 110 responds to asynchronous requests from the control module assembly 110, for example Distributed Control Interface (DCI) block commands, to provide information received by the assembly 110 from the Fieldbus devices 112, 114, and 116. In addition, the I/O Module Assembly 110 is capable of sending messages, comprising commands and data, to each of the Fieldbus devices 112, 114, and 116. The I/O module assembly 110 is furthermore capable of receiving, storing and processing commands from the workstation 102 (passed via the control module assembly) in a similar way.

In accordance with illustrative examples, commands (including requests to deploy a configuration) are performed in an automated process/procedure wherein either a single command (broken down into multiple sub-commands), or multiple commands initiated by a single initiation action, are handled in parallel by a cascaded deployment infrastructure. In a particular embodiment executing a command involves deploying device blocks (e.g., function blocks) to various Fieldbus devices is performed in an automated process/procedure wherein multiple blocks are handled in parallel by a deployment infrastructure. In the illustrative example, downloading device blocks, configured by a development environment application running on the workstation 102, to field devices (e.g., Fieldbus devices 112, 114 and 116) is carried out via cascaded parallel operations carried out by the control module assemblies (e.g., control module assembly 108) and I/O module assemblies (e.g., I/O module assembly 110) interposed between the configuration source (e.g., the Workstation 102 or application database 109) and Fieldbus devices (e.g., devices 112, 114 and 116) that will ultimately execute the deployed device blocks.

In accordance with an exemplary embodiment, deployment of device blocks to attached H1 Fieldbus devices is performed both automatically and in parallel in accordance with a previously specified configuration including, for example, a set of device blocks. However, a deployed configuration is not intended to be limited to the device blocks stored on particular identified devices. Rather, the deployed configuration potentially includes a potentially wide variety of data and executable program code that are downloadable to a field device to define a set of behaviors and actions performed by the field device before and/or after the field device has received a deployed configuration component (e.g., a function block, a command). Without limitation, such configuration components include: scripts, parameter sets, commands (HART), entire block definitions (including both code and parameter values), customizations/updates to existing blocks, etc.

In accordance with another aspect of the exemplary embodiment, the configuration application for specifying the configuration of device blocks ultimately deployed to and executed upon the Fieldbus devices supports a template library wherein a set of child (grandchild, etc.) templates are defined from one or more base device block templates. Once defined, the templates' derivation relationships are retained and visually displayed in the form of a collapsible/expandable hierarchical tree within a graphical user interface supported by the configuration application. See, FIG. 2 (Template Toolbox).

At runtime the configured tasks of the I/O module assembly 110 perform a variety of operations locally to acquire and process messages for use by process status control and monitoring applications.

Also, at runtime, in an exemplary embodiment the workstation 102 executes a set of previously configured tasks defined by computer-executable instructions stored on a physical computer-readable medium.

The process control network schematically depicted in FIG. 1 is a greatly simplified depiction of a control network for purposes of illustration. Those skilled in the art will readily appreciate that both the number of components, at each depicted level of the exemplary process control system, is generally many times greater than the number of depicted components. This is especially the case with regard to the number of depicted Fieldbus devices. In an actual process control environment, the number of Fieldbus devices, comprising both input devices (e.g., transmitters) and output devices (e.g., positioners) number in the hundreds (potentially even thousands) for an industrial process control system.

Having described an exemplary control network environment (including both development stations and runtime execution hardware), attention is directed to a set of exemplary steps associated with setting up a system to execute at least a portion of a defined control scheme in field devices. Setting up a process control network to operate in a Fieldbus Foundation control in the field (CIF) arrangement/environment, i.e., execute at least a portion of the device blocks on field devices connected to a field device bus (e.g., a Fieldbus H1 bus), includes:

1. Configuring field devices for particular points in a process control application (and then physically/wirelessly connecting the field devices at any time thereafter) to a CIF network;

2. Configuring sets of blocks (or additionally/alternatively executable code, task lists, command sequences, and/or parameter set configurations defining a control scheme to be carried out on one or more field devices) to be deployed to the configured/connected field devices;

3. Initiating deploying the configured sets of blocks (or more generally, control code and/or parameters) to appropriate control module assemblies (e.g., control processors);

4. Deployment of the blocks, by the control module assemblies, is commenced wherein control module assemblies (e.g., control processors), in parallel and independently of other control processors, attempt to download the configured blocks (or more generally control code and associated parameter value sets) to appropriately identified I/O module assemblies (e.g., fieldbus modules);

5. Deployment of a configuration, involving potentially many configured blocks to be hosted by several field devices residing on differing field buses, continues when each I/O module assembly (of which there are potentially many), in parallel and independently of other I/O module assemblies, deploys the configurations (e.g., block configuration definitions) to appropriate field devices connected to the I/O module assembly; and 6. Enabling the devices, after commissioning the field devices, causes commencement of the execution of control logic embodied in the blocks deployed to the devices.

Automated Deployment (Regardless of Availability of an Intended Target Node)

In accordance with an illustrative embodiment, deployment of a new/modified configuration (or portion thereof) for control in the field by specified host field devices, once initiated at a top level (e.g., from a workstation application user interface), is carried out without further directions from a user. Such automated execution occurs regardless of whether an intermediate or end target of a configuration definition part (e.g., a device block definition) is operating when the deployment of the new/modified configuration is initiated at the top level. Rather, the system described herein includes suitable storage and executable logic within nodes, at each level (e.g., control processor, fieldbus module) of a cascading deployment path, to: (1) monitor availability of an intended recipient at a next lower level, and (2) deploy a configuration to the intended recipient when the intended recipient is determined to be available.

In a particular embodiment, the control module assemblies (e.g., control module assembly 108) and the I/O module assemblies (e.g., I/O module assembly 110) maintain a set of the currently configured blocks that have been (or will be) deployed to a child node (e.g., I/O module assembly or field device). As a consequence, once a particular configuration of blocks is deployed, the control module assemblies and I/O module assemblies are able to carry out the initial deployment/commissioning instructions without further intervention from the initiator of the request. Furthermore, in cases where an intended target (e.g., I/O module assembly or field device) of a deployed block is presently not available to receive the downloaded block, the source of the deployed block (e.g., control module assembly or I/O module assembly) maintains a data structure containing the configured block(s). The source completes the deployment/commissioning, without further user intervention, at a later time when the target becomes available.

Thus, deployment of a configuration, including a set of blocks to be executed in a set of field devices, is potentially initiated from a process control scheme development environment (e.g., INVENSYS' Integrated Design Environment—or IDE) before any of the target field devices have been physically connected to a process control network bus (e.g., a Fieldbus H1 link). The definitions of the blocks to be executed in field devices are passed down to appropriate ones of a set of I/O module assemblies (in accordance with their configuration) where they are stored in any of a variety of possible structures (e.g., a table, a list, an array, etc.). The I/O module assemblies monitor their links containing (or intended to contain) field devices identified as the intended recipients of configuration information (e.g., configured function blocks). When the I/O module detects the availability of a target field device for which a configuration deployment is pending, the I/O module commences downloading the configuration definition (e.g., function block definitions) to the target field device.

Similarly, in an exemplary embodiment, the control module assemblies (e.g., INVENSYS' CP 270) are similarly programmed and structured to persist a deployed configuration and execute automatic monitoring and potentially delayed deployment operations for target I/O module assemblies (e.g., INVENSYS' FBM 228) that were not available at a time when the control module assembly initially received a deployment package containing a configuration including, for example, one or more blocks to be downloaded to field devices connected to a currently unavailable I/O module assembly.

Automated Self-Healing (Re-Deployment of a Configuration)

Moreover, each intermediate node within the cascading deployment path contains storage and deployment logic to facilitate persisting a deployed configuration for its children (targets of deployed configurations)—even after successful deployment of a configuration package to an intended target device/node. Thus, in the event a previously deployed configuration needs to be re-deployed (e.g., a fieldbus module or a device on a fieldbus is replaced), the intermediate node redeploys the configuration without intervention by a higher level source (e.g., a control processor or user) in the cascading deployment scheme.

Thus, the automated/parallel-executed cascaded deployment functions incorporated into (and executed upon) the control module assemblies and I/O module assemblies support automated commissioning of replaced field devices. After successful deployment of a configuration to an intended target device/node, a source of the configuration package (e.g., control module assembly or I/O module assembly) maintains a copy of at least the most recent version of the previously deployed configuration. Thus, in the event that a target field device or I/O module assembly (identified, for example, by a tag name) is replaced by another module/device having a same identification, the source of the configuration (e.g., control module assembly or I/O module assembly) carries out re-deployment of the previously deployed configuration for the replaced module/device without further intervention by a parent control module assembly or user.

It is noted that in an exemplary embodiment, both the control module assembly 108 and the I/O module assembly 110 (parent nodes) actively monitor their configured child nodes and actively push configuration definitions (e.g., function block definitions) to appropriate connected child modules/devices. When a new/replacement child is detected, the parent node checks a set of previously received configuration (e.g., function block) definitions and commences deploying the appropriate configuration definitions to the child node. The manner of communication and rules for deploying the configuration to the child node is determined, for example, by an initial negotiation of a deployment connection. During the negotiation, the source and target of the deployed configuration specify a manner in which the deployment will occur. In alternative embodiments the child nodes solicit the deployment from the parent node (i.e., pull deployment information from the parent node).

Parallel Execution of Configuration Deployment

In view of the automated nature of the deployment procedure and the initial negotiation of deployment data communication capabilities between an I/O module assembly and connected field devices, a highly automated parallel deployment operation/process is provided wherein the degree of parallelism is limited only by the abilities of individual field devices (negotiated on a per-device level). At a minimum, the deployment procedure supports simultaneous transfers by: (1) multiple control module assemblies to multiple I/O module assemblies and (2) multiple I/O module assemblies to multiple field devices connected to distinct field device buses. Moreover, if supported by connected devices (determined by negotiation), multiple deployment operations are potentially carried out in parallel on a same field device bus. In cases where a field device, during negotiation of a connection with an I/O module assembly, indicates an ability to support multiple pending writes of data (to a same or different block), the degree of parallelism in the download process expands accordingly. Thus, a deployment procedure involving potentially thousands of blocks downloaded to hundreds of field devices can be potentially carried out in a matter of minutes as opposed to hours or even days.

Figure 2:
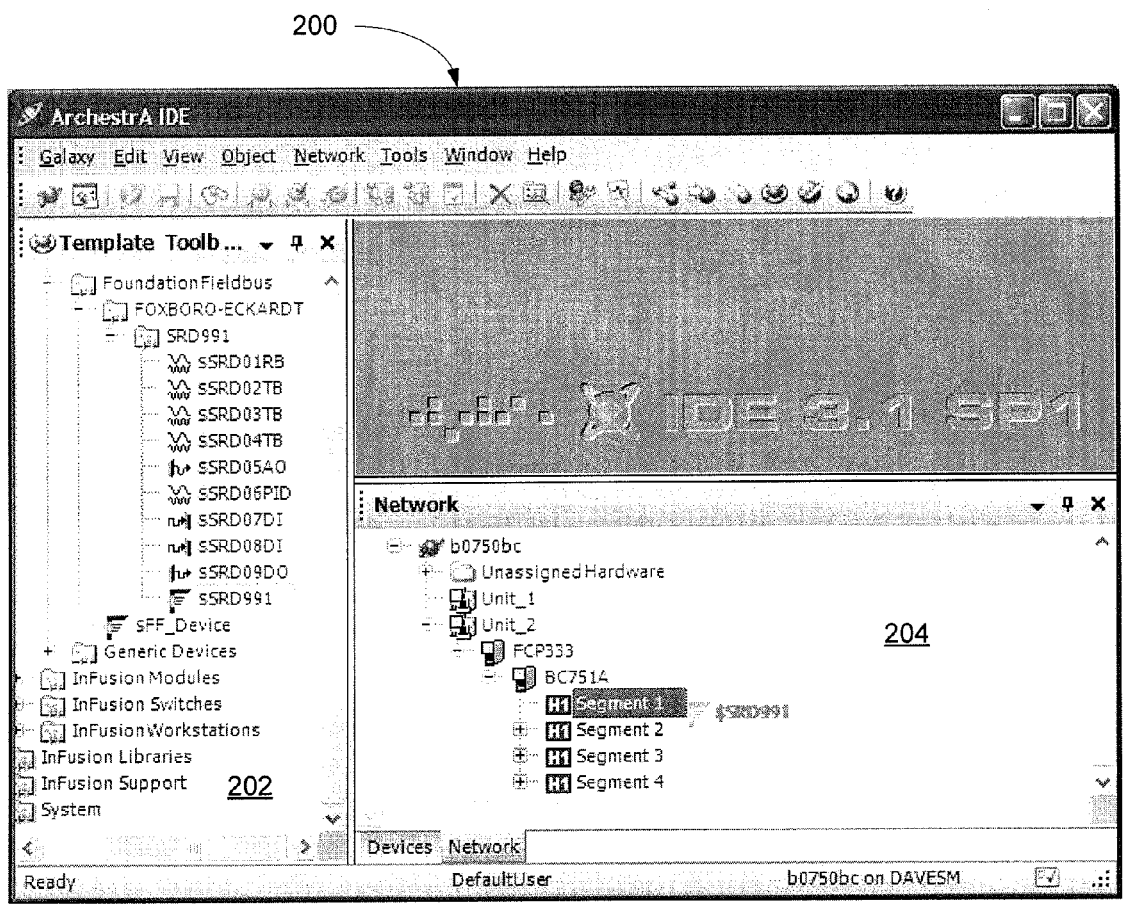
FIG. 2 is an exemplary development environment application graphical user interface for defining a configuration for execution in a control-in-the-field distributed process control environment.

Turning to FIG. 2, an exemplary development environment application graphical user interface 200 is depicted for defining a configuration for execution in a control-in-the-field distributed process control environment. In the illustrative example, instances of control module assemblies (e.g., INVENSYS' CP270), I/O module assemblies (e.g., INVENSYS' FBM228), and field devices (e.g., Foundation Fieldbus devices connected to H1 buses connected to an I/O module assembly are created from a set of predefined templates identified in a template toolbox pane 202 of the development environment user interface 200. In the exemplary embodiment a user defines a set of devices making up a distributed process control network graphically represented within a network pane 204.

The network pane 204 provides a graphical view of physical and/or logical relationships between control module assemblies, I/O module assemblies, and field devices in a distributed process control network. It is noted that the connections between nodes do not necessarily represent actual network topology. For example, while depicted as sharing a common graphical connection to a parent node in the depicted network tree in the network pane 204, each H1 segment is physically attached to a distinct port of an I/O module assembly. Similarly, while depicted as having a common graphical connection to a parent node in the depicted tree, each I/O module assembly is connected to a distinct port of a control module assembly. The network pane 204 view potentially assists a user during deployment of a configuration. For example, the network view can be consulted to determine a set of devices connected to a particular I/O module assembly in order to perform a partial deployment of a configuration. Deploying configurations to attached field devices via a cascading deployment path through a particular control module assembly and I/O module assembly is described herein below.

Configuring Control Module Assemblies

In the illustrative network view user interface example of FIG. 2, a Unit_2 node identifies a grouping of devices. Such grouping represents, by way of example, a particular location, process or any other physical/logical grouping of equipment in a production facility containing process control equipment. The Unit_2 includes at least one control module assembly (e.g., FCP333). In an exemplary embodiment, the FCP333 control module assembly instance is designated by initially creating an instance from a control module assembly template (not shown) in the template toolbox pane 202. The control module assembly initially receives a set of configurable identification parameter values (e.g., a unique name). Thereafter, the new control module assembly instance is added to the network configuration represented in network pane 204 by, for example, dragging/dropping the selected control module assembly template (not shown) from the temporary location to the Unit_2 node within the network pane 204. A named symbol (e.g., FCP333) representing the new control module assembly instance is created as a child node of the Unit_2 node. In an exemplary embodiment, configurable parameters/attributes of control module assemblies are accessed via a dialog box launched by right-clicking on the node in the network pane 204 corresponding to the control module assembly of interest and selecting an editor from a context menu.

Configuring I/O Module Assemblies

Similarly, a user performs drag/drop actions on one or more I/O module assembly templates (e.g., FBM228 fieldbus module templates—not shown) presented for selection by a user via the template toolbox pane 202 to designate a set of I/O module assemblies (e.g., BC751A). In an exemplary embodiment, a user initially creates an instance from an I/O module assembly template (not shown) in the template toolbox pane 202. The I/O module assembly is initially placed in a temporary location (e.g., Unassigned Hardware folder) for initially specifying configurable parameters (e.g., a unique name within a set of I/O modules assemblies connected to a same control module assembly). Thereafter, the new uniquely named I/O module assembly instance is added to the network configuration represented in network pane 204 by, for example, dragging/dropping the selected I/O module assembly instance (not shown) from the temporary location to a node within the network pane 204 representing a control module assembly to which the I/O module assembly is to be connected. A named symbol (e.g., BC751A) representing the new I/O module assembly is created as a child node of the control module assembly node. In an exemplary embodiment, configurable parameters/attributes of I/O module assemblies are accessed via a dialog box launched by right-clicking on the node in the network pane 204 corresponding to the I/O module assembly of interest and selecting an editor from a context menu. In accordance with exemplary embodiments, the configurable parameters include designating either or both standard (common to all I/O modules) and protocol-specific parameters. Examples of standard configurable parameters including a tagname, segments (e.g., H1 buses) connected to the ports of the I/O module assembly, alarming, and scheduling parameters relating to connected segments.

Configuring Field Devices on Configured Segments

After defining at least one I/O module assembly under a control module assembly and defining at least one H1 segment under the I/O module assembly, a next step in configuring the fieldbus is to add field device instances to the H1 segments and modify device parameters that are not locked by their defining templates. In an exemplary embodiment, a field device is added to an H1 segment in a configuration represented in the network pane 204 by:

1. Expanding a node representing an I/O module assembly on the network pane 202 to display a set of configured H1 segments belonging to the I/O module assembly (and any field devices already configured on the H1 segments); and 2. Dragging a selected field device template (e.g., $SRD991 in FIG. 2) template (marked with the icon) from the template toolbox pane 202 to a target H1 segment in the network pane 204—resulting in an instance of the selected field device being created in the configuration.

The field device is added to the H1 segment in the configuration definition, and the field device instance is given a temporary name. In an exemplary embodiment, a field device equipment control block (maintained in a parent control module assembly) that represents the field device in the process control system. The user is prompted to change the automatically assigned name of the new field device in the configuration.

Figure 3:
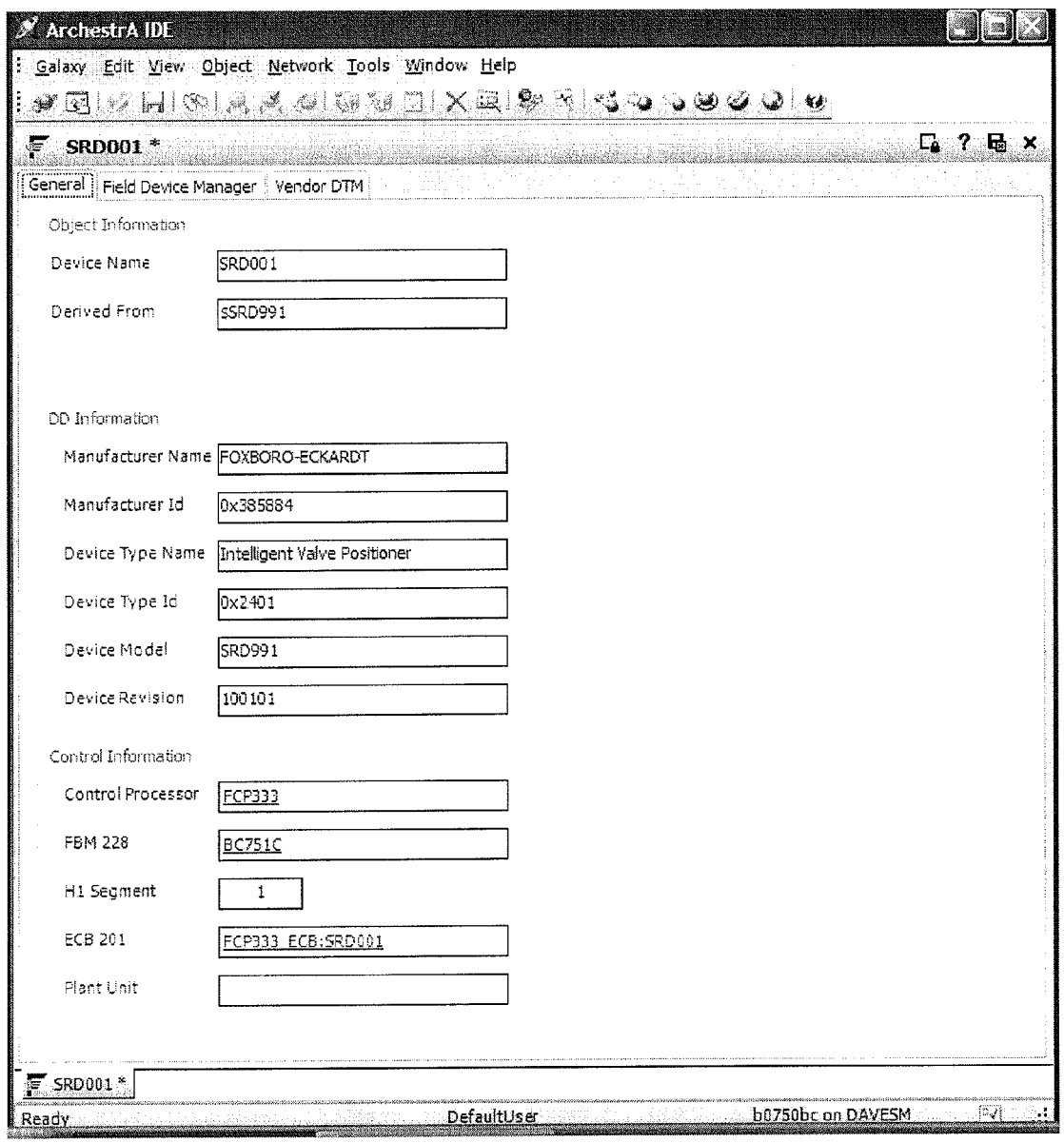
FIG. 3 is an exemplary device configuration editor interface opened and populated with information for a particular field device.

Turning to FIG. 3, an exemplary configuration editor interface is presented. In an exemplary embodiment the device configuration editor program is opened, and populated with information for a particular field device, when a user double clicks on the field device representation within the network pane 204. The exemplary configuration user interface includes a general Tab (depicted in FIG. 3) including three groups of read-only fields specifying:

1. Field device Object Information including the name of the device and the device template from which the device instance was created;

2. Device Description file information providing model and revision information provided by the device template based on a device description file for a particular field device type with which the device template is associated; and 3. Control Information identifying the field device instance's ECB and the plant unit, control station, FBM and segment to which the device is assigned (i.e., the deployment path for a configuration assigned to this field device instance).

Regarding the Control Information, the Control Processor and FBM228 fields of the Control information provide links to editors for the control station and FBM, respectively. The ECB201 field shows the pathname of an equipment control block for the field device instance. Clicking the link opens an ECB compound (e.g., FCP333_ECB) in a Block Configurator application providing user access for editing the field device's ECB. A Plant Unit field displays the unit with which the field device instance is associated. Since a unit is merely a logical grouping with no functional purpose, associating field device instances with plant units in a configuration is optional.

The configuration editor user interface for a field device also includes a field device manager (FDM) tab. This well known editing facility provides access to a user-extensible set of tabbed pages of a well known device type manager (e.g., INVENSYS' device type manager) utility. The fields presented by the FDM are primarily designated when defining templates (as opposed to instances).

Returning to the aforementioned equipment control block (ECB) for a new field device defined in a configuration, an equipment control block (e.g., ECB201) is created to represent each field device represented in a control system configuration. When a host I/O module assembly is assigned to a control module assembly, the ECB for the field device hosted by the I/O module assembly is added to the control module assembly's ECB compound. Therefore, when a field device is added to the FBM228, the ECB201 is fully configured to support the new field device and ready for use.

Figure 4:
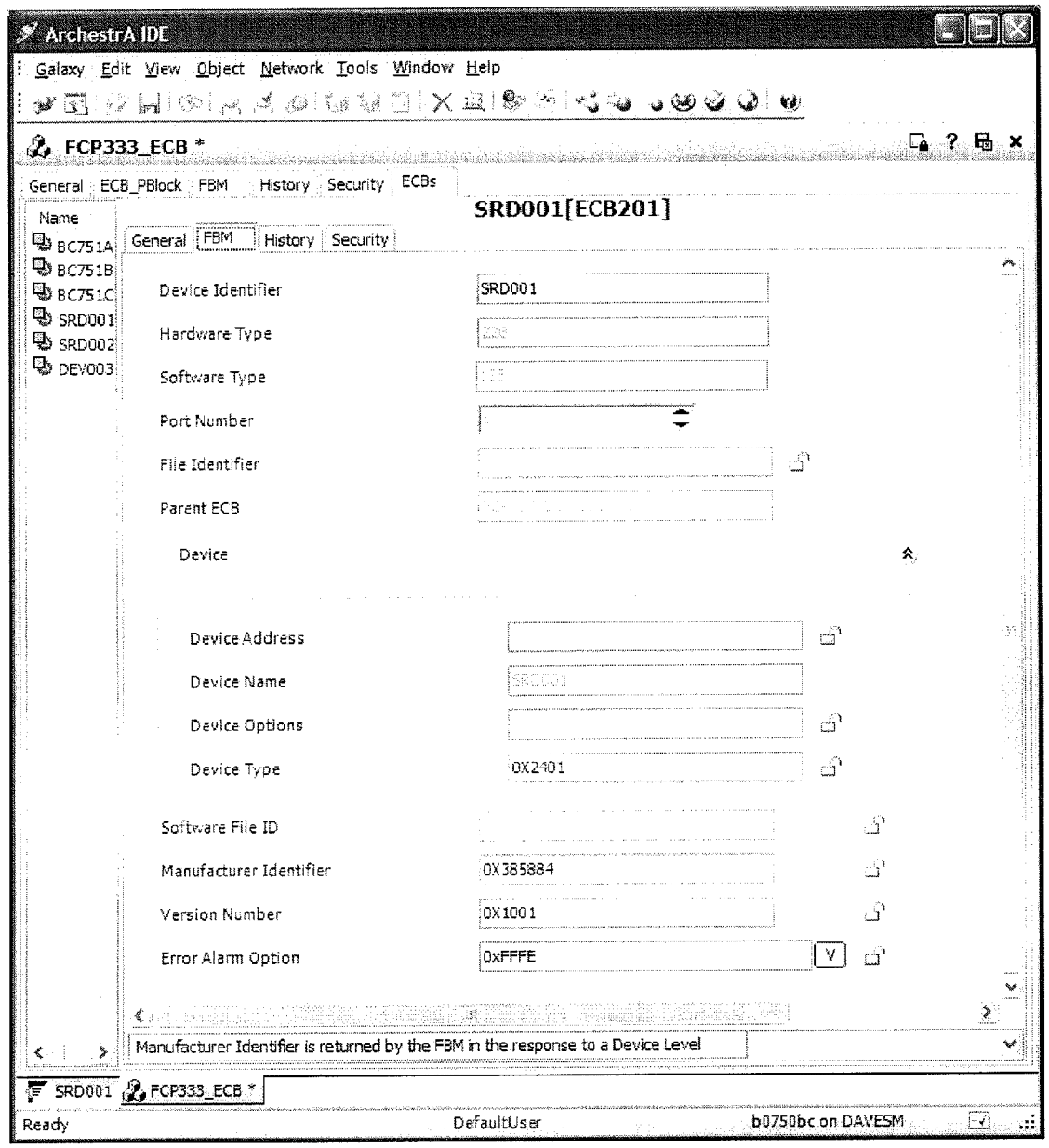
FIG. 4 is an exemplary equipment control block editor interface for an I/O module assembly.

The ECB for a configured field device includes parameters specifying an I/O module assembly to which the configured field device is (to be) connected. In an exemplary embodiment (see, FIG. 4), the fields of parameters specifying the connected I/O module assembly (FBM) are displayed within an FBM sub-tab of the ECB editor. The exemplary FBM tab includes a Device Identifier field that presents a text string representing the name used by a control module assembly to track the field device. Other fields include a hardware type, software type which may be used to ensure a proper identity/setup for a field device. A port number field specifies the H1 segment of the FBM to which the configured field device is (to be) attached. A parent ECB specifies an ECB for an I/O module assembly to which the configured field device is to be attached. A device address field specifies a configured address for the field device on the H1 segment to which the field device is assigned. A device name specifies a (tag) name previously assigned to the field device. A device options supports designating a set of coded options for customizing the operation of the field device. A device type contains a value extracted from a device description (DD) file for the particular type of the field device (obtained from the field device's template). A manufacturer identifier contains a read-only device description (DD) based identifier for the field device (provided by the manufacturer) extracted from the device template from which the field device instance was created. A version number specifies a version of the field device provided by the device template. An error alarm option enables a user to view a set of reportable error conditions experiences by the field device.

Configuring Device or Device Blocks (Deployed to and Executed Upon the Field Devices)

Figure 5:
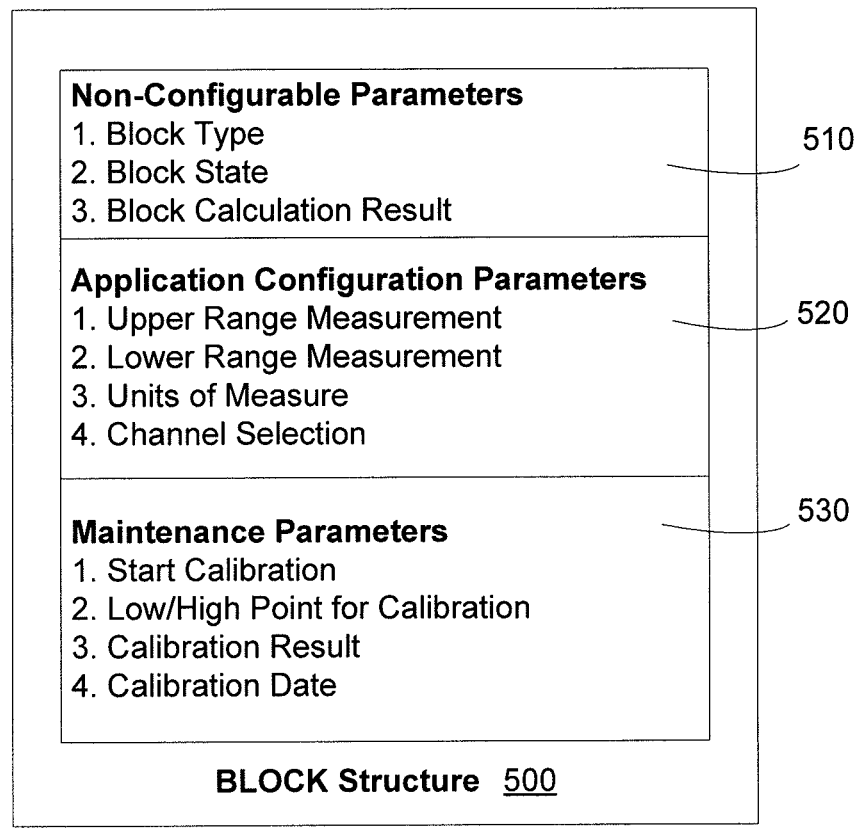
FIG. 5 schematically depicts an exemplary set of fields for a function block deployable in a parallel, cascaded manner in accordance with an illustrative embodiment.

Turning to FIG. 5, an exemplary partial/summary set of parameter fields for a block structure 500 is schematically depicted. In the illustrative example, the block structure is a Fieldbus Foundation block. However, alternative block structures are contemplated in embodiments of the invention. In an exemplary embodiment, the fields of the block structure 500 are designated via a configurator application executable on the workstation 102. Alternatively, definitions for fields of the block structure 500 are defined externally using, by way of example, a spreadsheet application. The externally defined parameter information is thereafter incorporated automatically into a set of block definitions via importation tools/wizards that utilize manufacturers' device description files.

Turning to the content of the block structure 500, a partial listing of exemplary fields of an illustrative block structure include non-configurable parameters 510. While the set of non-configurable parameters 510 can be extensive, in the illustrative example the non-configurable parameters 510 include: block type, block state, and block calculation result. The block type comprises a value specifying a particular type of Fieldbus Foundation standard block. Examples of such blocks include PID, IN, OUT, etc. blocks. The block state specifies a current status of the block once it has been deployed and commissioned on an execution engine (e.g., a control processor or field device). The block calculation result specifies one or more values calculated as a result of execution of the block upon the execution engine.

The block structure 500 also includes application configuration parameters 520. The application configuration parameters 520 are generally configurable by a user for a particular application in the field such as, for example, reporting a process variable value (e.g., temperature, pressure, etc.). An upper range of measurement specifies a value corresponding to a highest output signal value for the field device with which the block is associated. A lower range of measurement specifies a value corresponding to a lowest output signal value for the field device with which the block is associated. A units of measurement specifies a value corresponding to the units of measurement (e.g., pounds per square inch, degrees Celsius, etc.) of the values measured by the field device with which the block is associated. A channel selection specifies a particular data channel to which the block is assigned for providing process variable and other status values associated with the block.

Furthermore, the block structure 500 includes a set of maintenance parameters 530. The maintenance parameters 530 generally comprise a set of parameters that are typically set once (e.g., calibration settings) and then left unchanged unless a need arises in association with maintenance of a related device (e.g., replacing a sensor). In a more particular example, a positioner is calibrated once after installation on a valve and the calibration is not changed until the device is maintained—e.g. sensor is replaced, mechanical connection is adjusted, etc. Exemplary maintenance parameters include:
  Start Calibration
  Low point for calibration
  High point for calibration
  Calibration Result
  Calibration date
  Name of the person performed calibration
  Next scheduled calibration date, etc.

The fields of the block structure 200 and the manner of specifying the parameter values stored within the block structure 200 need not conform to the above-described illustrative examples. Rather the form and manner of defining such information for blocks differ in accordance with various embodiments.

Configuring Download Behavior for Deploying Blocks Executed Upon Field Devices

Figure 6:
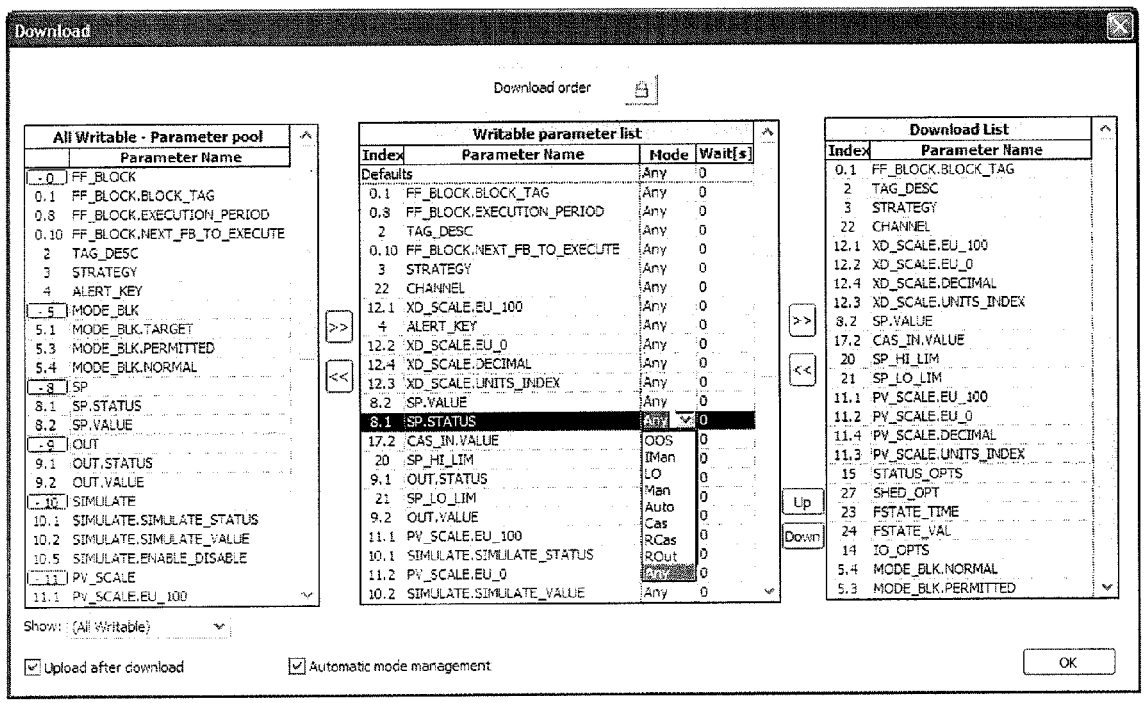
FIG. 6 depicts and exemplary block parameter configuration (template/instance) interface for defining a set of downloadable parameters for a block during deployment.

Turning briefly to FIG. 6, and exemplary block parameter configuration interface is illustratively depicted. In the illustrative example, configuring blocks for deployment to field devices on H1 segments includes specifying: (1) a set of parameters to be written, (2) values to be written to the parameters, and (3) how the parameter values are to be written to the field devices (including both serialized order and delays between successive writes to a particular device). In an alternative embodiment wherein the recipient devices are HART devices, the parallel deployment of a configuration takes the form of a set of commands (e.g., parameter write operations) issued in parallel to a set of HART devices.

In general, with regard to download behavior during deployment of a distributed process control configuration, device block configurations are initially downloaded to the device as part of a control configuration definition deployment. First, block configurations are downloaded to control module assemblies containing both programmed procedures for conditionally downloading configured blocks to target I/O module assemblies. If the target I/O module assembly is available, the control module assembly automatically commences transferring a portion of an overall process configuration to the target I/O module assembly. Similarly, the target I/O module assembly monitors the availability of target field devices on connected H1 device buses. Upon sensing the availability of the intended destinations for configured blocks (e.g., detecting a field device with a matching tag on an appropriate segment), the I/O module assembly commences writing configured block parameter values for appropriate blocks to the field devices. The download operation is performed according to (1) a negotiated connection between the I/O module assembly and (2) a target field device and the block configurations rendered from the block configuration user interface depicted in FIG. 6 and described herein below.

The following description of FIG. 6 herein below describes and exemplary block parameter download scheme specifying a set of parameters and how to download values for the set of parameters. The described configuration is performed at either a template or instance level (if the setup is not locked by the instance's defining template). In an exemplary embodiment, the download customization interface depicted in FIG. 6 is launched from a control presented in association with the particular block (instance or template). The download customization interface supports user specification of:

a. Which device block parameters are to be downloaded to a field device when the block instance is deployed to a field device during a configuration deployment procedure (described herein below);
  b. An order in which the individual parameter values of a deployed block are downloaded;
  c. How to handle changes in the block operating mode;
  d. Whether to upload parameters at the completion of writing the parameter values to the field device; and
  e. Wait times after specific individual parameters are downloaded.

These settings govern both an initial deployment of the block configuration to a field device as well as subsequent deployment of modified parameters. The settings depicted in FIG. 6 also govern downloads to field devices when a field device is replaced or reset (necessitating re-writing the parameters of each block contained in the replaced/reset field device).

With specific reference to FIG. 6, the exemplary block configuration download dialog supports configuring a "Writable Parameter List" and a "Downloadable Parameter List" for a particular block template or instance. The Writeable Parameter List (the middle list of the three depicted in FIG. 6), is generated from the list of all available read-write parameters for a block listed in the "All Writable—Parameter pool" list on the left pane of the exemplary interface. Select parameters between the two parameter listings are used to copy or delete parameter values from the adjacent lists depicted in FIG. 6.

In an exemplary embodiment, ordering of parameters in the Writable Parameter List determines an order in which the parameter values written by the I/O module assembly to a target field device. Moreover, a "mode" field in each listed entry in the Writable Parameter List enables specifying a required mode of the field device (e.g., OOS—out of service) when the new parameter value is written for a deployed/redeployed block. A "wait" field for a specified parameter entry supports specifying, a wait period executed by the I/O module assembly upon completing the write operation for the parameter (before commencing writing a next parameter value in the writable parameter list).

A "Download List" is presented in the right-most pane of the exemplary block parameter configuration user interface. The Download List enumerates a set of parameters for which a value is written by the I/O module assembly to a target field device when: (1) the configured block is deployed, (2) a download all "command" is specified from a field device manager interface (or other configuration deployment control interface), or (3) the target field device is reset. With regard to the second case, a user can create a download list and parameter values for a particular block and then perform a simulated deployment from the field device manager. After observing the results of simulated deployment, the user corrects any errors and retries the simulated deployment. Thereafter, the block is deployed as part of a parallel deployment of block configuration packages in association with the first case.

In an exemplary embodiment, downloading changed parameter values of deployed blocks is carried out by a source I/O module assembly according to: (1) stored computer-executable instructions contained in a deployment logic module, and (2) a set of parameter values, specified in a block deployment package, for a block to be (re)deployed on a target field device. Moreover, once a set of configured blocks are (re)deployed to an I/O module assembly, the I/O module assembly downloads the complete set of parameter values for each (re)deployed block to a field device without further instructions or intervention by a user. Thus the role of a user is greatly reduced with respect to initially setting parameter values in blocks deployed to potentially thousands of field devices and thereafter maintaining a configuration deployed to the field devices when such devices are replaced or reset. The actual deployment and maintenance operations carried out by the I/O module assemblies is discussed further herein below.

It is noted that each list in FIG. 6 includes an index field. The index field is a set value used to specify a location of the parameter value within a data structure for the block on a field device. It is further noted that the user interface depicted in FIG. 6 is provided, by way of example, in a field device manager editor facility provided in a control system configuration design/development environment. However, the downloadable/downloaded parameter lists can be presented and edited in any of a variety of ways in accordance with alternative embodiments.

Configuring how Parameters of Deployed Blocks are Written to Field Devices

FIG. 7 provides an example of a set of parameters on the above-described "Download List" for a block. In addition to defining the content of blocks deployed on field devices, in an exemplary embodiment the block configurator editor (see, FIG. 6) on the workstation 102 supports defining how the configured blocks are deployed on control processors and/or field devices within a process control network. As noted above, a user specifies download order by specifying the position of the parameter on the "Download List" interface in FIG. 6. Turning to FIG. 7, an exemplary set of block parameters are identified along with a configured set of sequence, condition and delay values which define a particular way for the I/O module assembly 110 writing a set of configurable block parameters to a field device during deployment of the block configuration to the field device. In the exemplary embodiment, a set of sequence values (one distinct value per parameter value for the block) are specified (see, second column) which determine an order for writing the parameter values of a particular block to a specified field device during deployment of a configured block to the device. The sequence values are specified in any of a variety of ways including: device description files, a block configurator user interface or a provided vendor-defined configuration set.

A set of conditions (e.g., required modes, including both pre- and post-writing and generalized requirements such as having a group of parameters being changed in the event that any one is changed) that must be met to enable writing each particular parameter value. Conditions can be any of a variety of types including: a list of parameters that must also be set with this parameter, device mode, second-user verification, etc. In the exemplary embodiment the conditions include "OOS" which represents the condition of "out of service". An "any" condition indicates that no specific conditions are required. The conditions field of a block configuration is specified by, for example, device description files, specifications, users, and vendor recommendations.

A set of delay values that specify a wait period, after writing the parameter value to the field device, are illustratively depicted in FIG. 7. In the exemplary embodiment, a 0.2 second delay is required after writing an "input units" parameter value to the field device and a 0.7 second delay is required after writing an "output units" parameter value. The delay values are specified by, for example, device description files (provided by field device manufacturers), specifications, users, and vendor recommendations.

Figure 8:
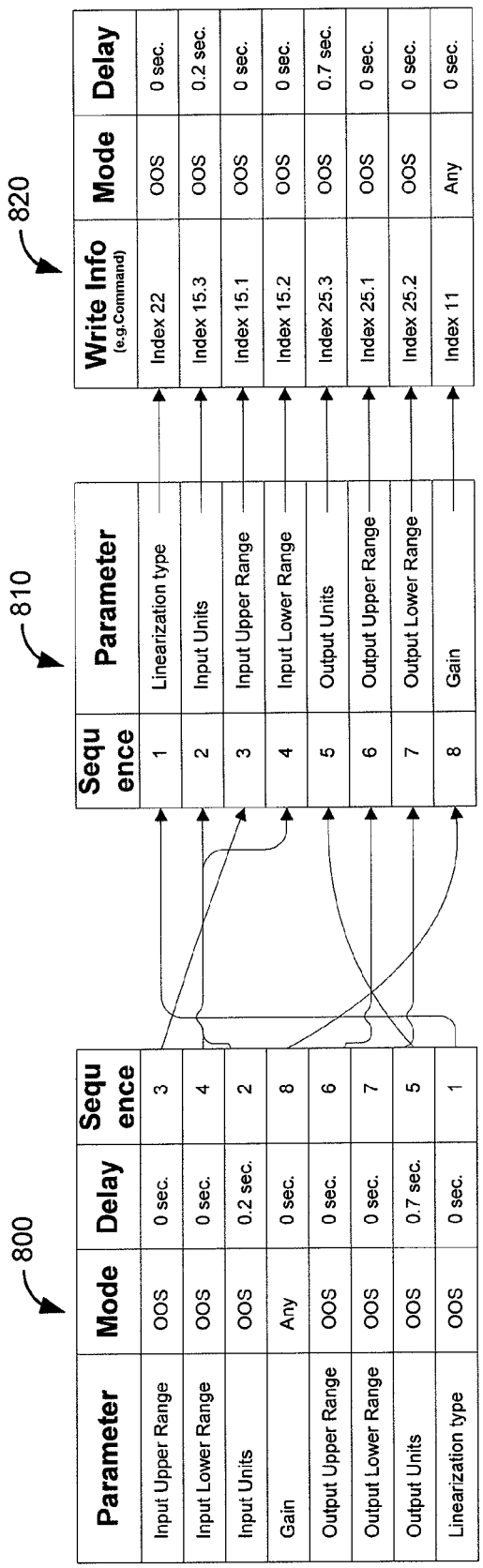
FIG. 8 schematically depicts an exemplary set of structures associated with defining a download behavior for a block, including designation of a particular download sequence for parameter values for the block.

After a set of parameter values (see, FIGS. 6 and 7 described above) have been specified for a block configuration, the set of parameter values are processed/applied by components of a process control network (e.g., I/O module assembly 110) during deployment of the corresponding block configuration to a designated host (e.g., control processor or field device). Turning to FIG. 8, processing the previously configured parameter values, to render a deployable block configuration, is summarized with regard to a table 800 containing the set of parameter values provided in an initial download list enumerated in FIG. 7. During a sequencing stage, carried out during configuration via the "Download List" depicted in FIG. 6, the parameters (rows of the previously described table 800) are reordered according to their sequence values resulting in a sequenced listing of configuration parameters provided in partial parameter table 810. The complete set of block configuration table entry columns are not depicted in table 810 to avoid undue clutter since the remaining columns are presented in an index-enhanced partial parameter table 820.

Text labels for parameters (i.e., the "parameter" column in the partial table 810) are generally for presentation of parameters to human users. In the illustrative example, the sequenced set of block configuration parameter values is augmented to include address information identifying where each parameter is written in a destination (e.g., field device) during deployment of a block configuration to a target field device (or other target destination for execution). In the illustrative example, the index-enhanced partial parameter table 820 includes a "Write Info" column for specifying an index value (write location) for each parameter. Such information is generally provided by a device description file provided, for example, by an intended field device that will receive the set of configured block parameter values during a (re)deploy procedure. However, other sources of such information (e.g. vendor instructions) are contemplated.

Having described the creation of a configuration for a process control system, including specifying networked devices and deployable blocks for execution on the devices, attention is directed to deploying the configuration in accordance with exemplary embodiments.

Figure 9:
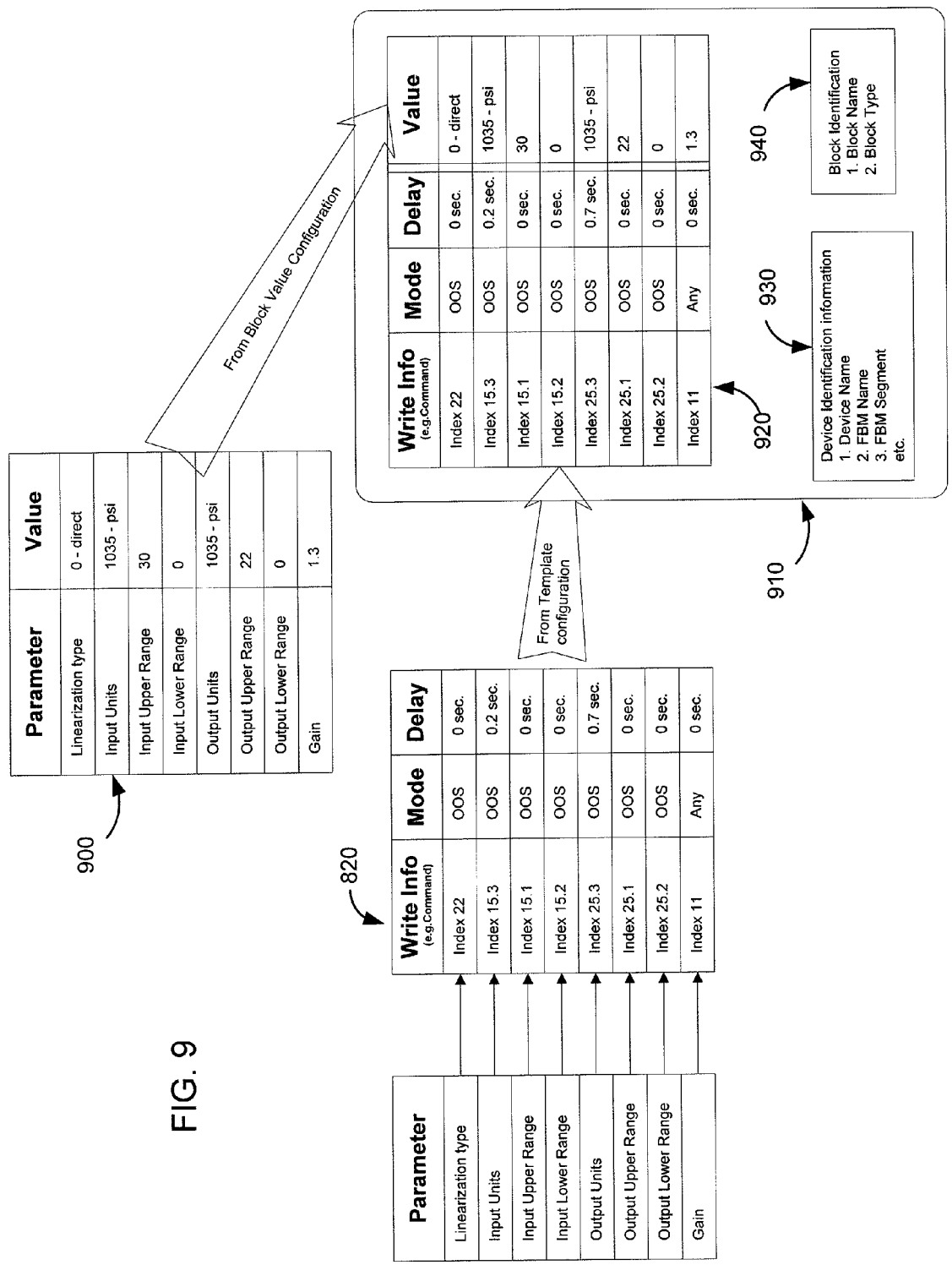
FIG. 9 schematically depicts sources and content of an exemplary deployment package for a single block.

Turning to FIG. 9, a schematic drawing shows the sources and content of an exemplary deployment package for a single block. A set of actual values for each of the set of configured writable/downloadable parameters for a block are specified by a user (or other source such as default values specified by a device description file or vendor's recommended configuration) in a parameter value data structure 900. In accordance with an illustrative example, a deployment package generator of the Fieldbus device network configurator executing on the workstation 102 applies the parameter values of table 900 to the sequenced/indexed parameters of combined partial tables 810 and 820 to render a deployment package 910. In the illustrative example, the deployment package for a configured block includes a deployment table 920 including a listing of each parameter to be written during deployment of the block to a device (e.g., field device). By way of example, the deployment table 520 includes, for each writable block parameter value, an index, mode, delay, and value—each of which have been described above.

The deployment package 910 for a configured function block includes a set of identifications to facilitate proper deployment of the function block in a specified field device. By way of example, the deployment package includes device identification information 930. By way of example, a set of equipment identifiers are provided (e.g., a device tag, network address, etc.) facilitating identification of a target device for the block during deployment. In addition the device identification information specifies, by way of example, a path to a destination device for the deployed block. In an illustrative example, the path identifies a target I/O module assembly and a segment connected to the target I/O module assembly. During deployment of the block deployment package, deployment logic on the workstation 102 determines the parent control module assembly to which the target I/O module assembly is connected by referencing a network definition created by, for example, the previously discussed network configuration tool (see, FIG. 4).

Moreover, a block identification 940 (e.g., a GUID or human readable name) is provided to uniquely identify the block within the process control network. The device identification information 930 and the block identification 940 ensure that the proper block is deployed to the proper device (e.g., field device) during a (re)deployment procedure described herein below.

Designating Deployment

Figure 10:
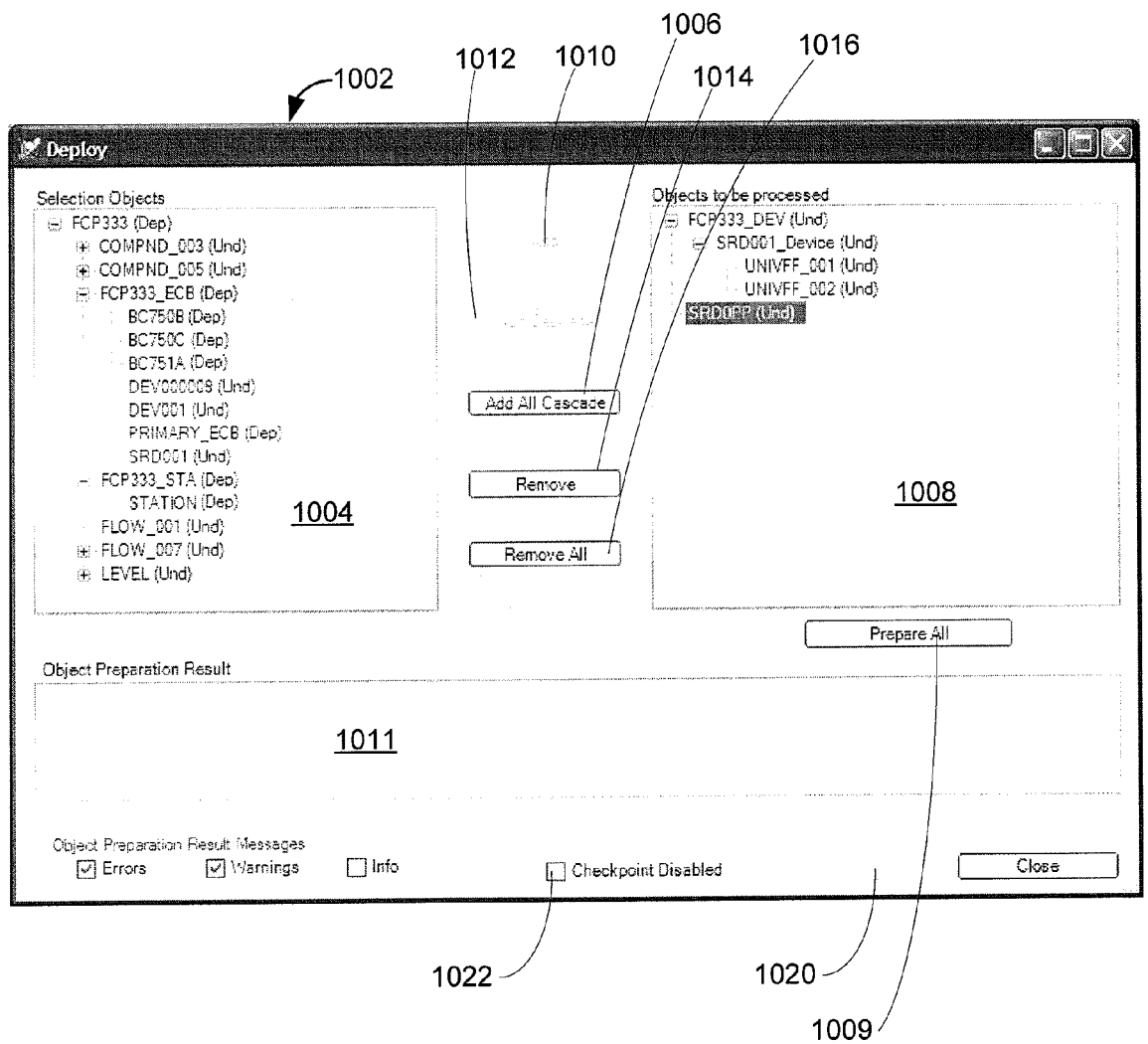
FIG. 10 is an illustrative graphical user interface for a program that enables a user to specify, initiate, and monitor deployment of a configuration for a process control system.

Turning to FIG. 10, an illustrative user interface is provided for a program stored and executed upon the workstation 102 that enables a user to specify, initiate, and monitor deployment of a configuration for a process control system. The deployed configuration potentially includes, by way of example, device instance configurations as well as control programs for a process control system including a variety of device blocks (e.g., function blocks).

In an exemplary embodiment, before placing a field device instance into operation, an equipment control block (ECB) corresponding to the field device is downloaded to its associated control module assembly and I/O module assembly. The equipment control block provides and stores information about the corresponding field device. Configured blocks can be deployed to the field device once its ECB has been successfully installed. In an exemplary embodiment, the configured blocks include resource and transducer blocks contained in the device strategy and function blocks from control strategies.

During the actual deployment, the I/O module assembly scans its connected segments, and upon identifying a match between a tag on a device and a device tag name provided by a deployable configured block or set of blocks, the I/O module assembly commences downloading the deployable configured block(s). The manners in which the block configuration(s) are deployed to the matching device are determined by the negotiated capabilities of the I/O module assembly and the particular target field device. The actual deployment operation is discussed further herein.

Figure 11:
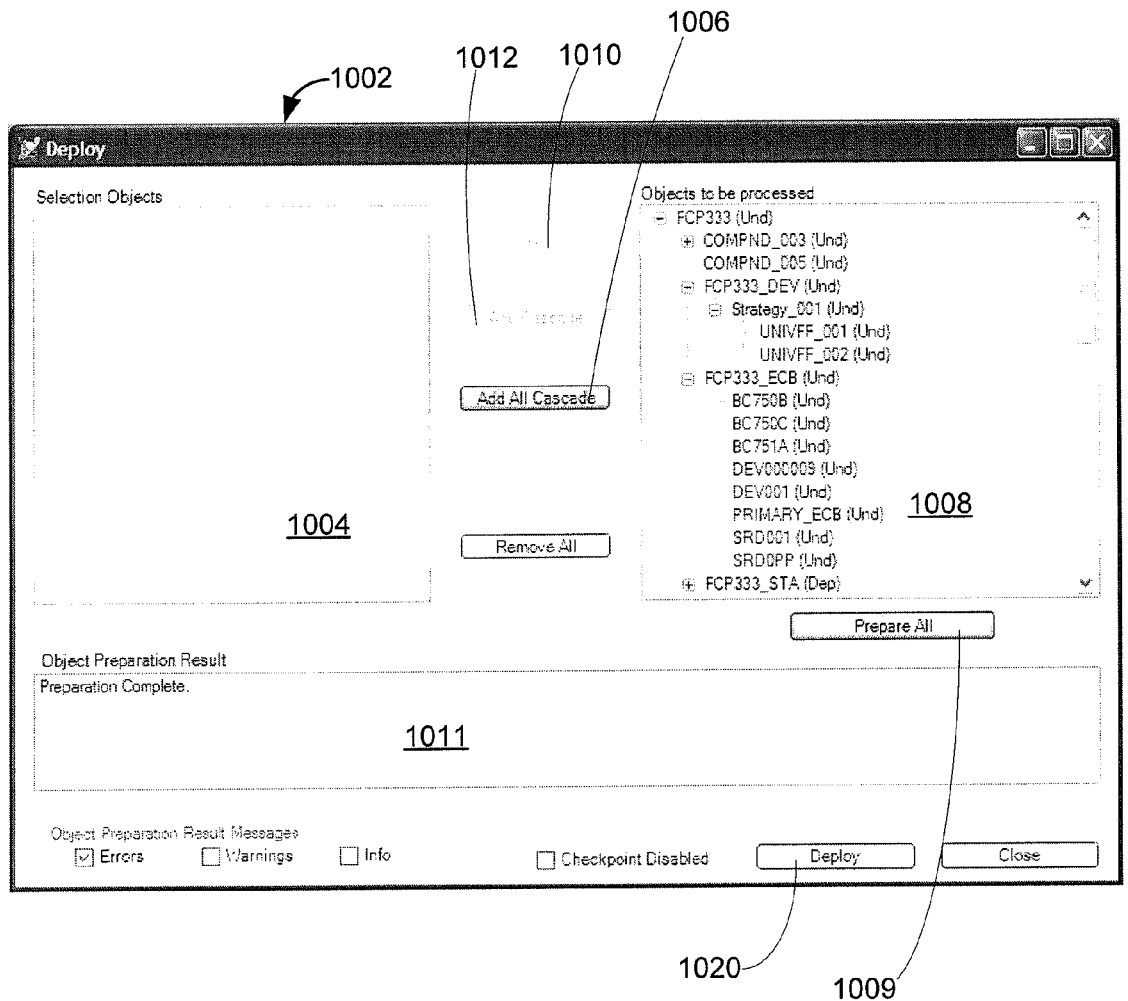
FIG. 11 is another illustrative graphical user interface for a program that enables a user to specify, initiate, and monitor deployment of a configuration for a process control system.

Attention is directed to an exemplary Deploy dialog box (FIGS. 10 and 11) to deploy device ECBs, device strategies and control strategies containing fieldbus function blocks. In the illustrative example of a user interface (and underlying execution software) for selecting and initiating deployment of a configuration, a user is permitted to deploy an entire control application configuration in one operation by selecting a control station in a Deployment view (see, FIG. 12) and selecting "deploy" from the selection's context menu. The control station deployable configuration includes deployable blocks for download through potentially many control module assemblies and I/O module assemblies. Thereafter, the user opens a Deploy dialog box 1002 (FIG. 10). The portion of a deployable/deployed configuration selected from the Deployment view is depicted in a Selection Objects pane 1004. A user selects an Add All Cascade button 1006 to cause all blocks from the Selection Objects pane 1004 to be moved into the Objects To Be Processed pane 1008. Turning briefly to FIG. 11, an exemplary view is provided showing the empty Selection Objects pane 1004 after the Add All Cascade button 1006 is selected which causes all the items previously presented in the Selection Objects pane 1004 to be moved to the Objects To Be Processed pane 1008.

An Add button 1010 adds a single selected object from the Selection Objects pane 1004 to the Objects To Be Processed pane 1008. An Add Cascade button 1012 instructs the deployment configuration editor to add all currently undeployed objects under/including a selected node on the Selection Objects pane 1004 to the Objects To Be Processed pane 1008. A Remove button 1014 causes deletion of a currently highlighted selection from the Objects To Be Processed pane 1008, and a Remove All button 1016 clears all the items from the Objects To Be Processed pane 1008. A portion of a configuration can be deployed. In such cases, a block is deployable if all items above the block have been deployed or will be deployed with the block.

During preparation of blocks for deployment, the deployment packages (see, FIG. 9), corresponding to the selected undeployed blocks (indicated by "Und"), are prepared and any errors are displayed in an Object Preparation Result pane 1018. The view in FIG. 11 depicts an exemplary user interface after a user selects a Prepare All button 1009 that invokes a computer-executable program to prepare the currently selected blocks for deployment. The results of the "prepare" operation (a set of deployment packages) are stored on the workstation 102 and/or on a networked server. If the block fails the preparation stage, the errors are listed in the Object Preparation Result pane 1018. In the example in FIG. 11, no errors are detected, and the Object Preparation Result pane 1018 states "Preparation Complete" to indicate that the packages are ready for deployment.

In an exemplary embodiment, during preparation of block deployment packages, each selected block is checked to determine whether it can be deployed. By way of example, the following is confirmed:

Blocks are uniquely named within their compounds, and compounds are uniquely named within the global namespace.

The parent or host for each block is already deployed or will be deployed with the object.

Block types and parameters are valid for the target control module assembly revision level.

In an exemplary embodiment, during preparation the schedules for segments affected by the deployment are recalculated to ensure that the newly deployed and already existing blocks can execute within a configured macrocycle period. More particularly, in the case of Fieldbus Foundation function block scheduling, a schedule is generated for each device with regard to when each deployed block is executed. Furthermore, schedules are generated for each H1 segment to ensure availability of published data for subscribers on the link. Scheduling thus ensure consistency of data processed by subscribers on an H1 segment.

With continued reference to FIGS. 10 and 11 check boxes are provided in the exemplary user interface allowing a user to designate the types of messages generated in the Object Preparation Result pane 1018 including errors (e.g., node above a selected node is not deployed or selected to be deployed), warnings and information.

A Deploy button 1020 is rendered active (for selection by a user) if no "errors" are detected during the block deployment package preparation. In an exemplary embodiment, the deployment packages are still considered ready to deploy if "warnings" are issued. Deployment commences, in a cascading and parallel manner, upon selection of the Deploy button 1020. In an exemplary embodiment, deployment occurs in a cascading manner in the sense that, at each level, if an intended target for a deployed block is not yet attached and fully commissioned (e.g., a field device is not yet attached to a particular segment and assigned a unique device tag name identifying the device on the segment), the deployment package is held in a deployment buffer in anticipation of the intended target coming on-line.

Figure 12:
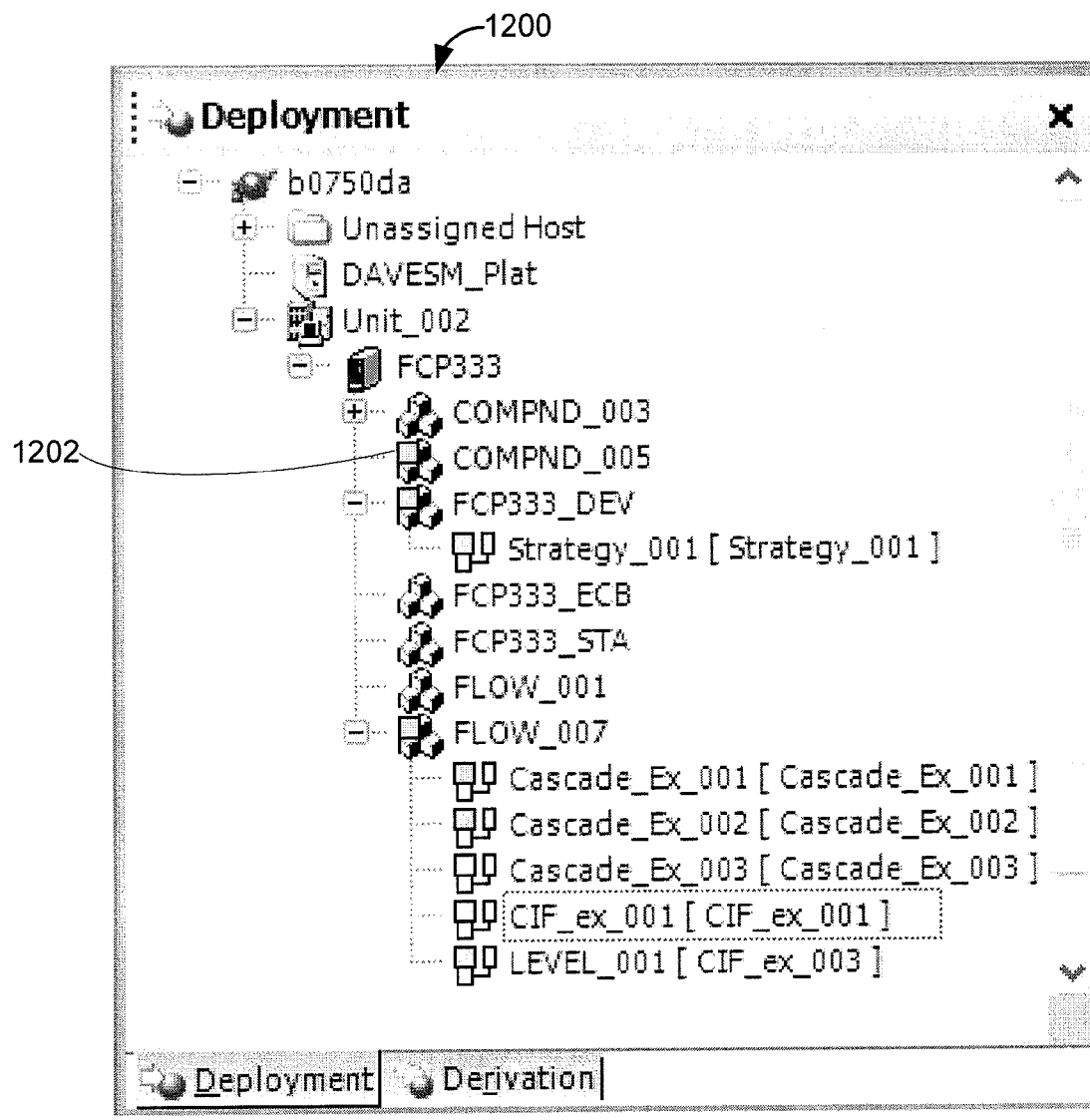
FIG. 12 is an illustrative graphical user interface for monitoring deployment status of particular portions of a configuration for a process control system.

Turning to FIG. 12, a Deployment dialog 1200 provides a user interface representing a deployable configuration, including devices and blocks, and the deployment status (undeployed, deployed, partially deployed) of the configuration. In the illustrative example, a fully filled in square 1202 placed near/on a node indicates a fully deployed block or set of blocks (e.g., a compound). A partially deployed compound is indicated by a half-filled block, and an undeployed compound or block has no square. In the exemplary interface, the Deployment dialog 1200 is presented as a tree having collapsible nodes at each level. As noted previously above, a user selects a particular device, compound or block for deployment by right clicking on the desired object and then selecting the "deploy" option provided in the context menu to launch the Deploy dialog 1002 depicted in FIGS. 11 and 12. In an exemplary embodiment, the status of each node is provided via deployment status tracking logic embodied within one or more levels of the nodes that participate in a deployment operation on a configuration. The depiction of deployment statuses in FIG. 12 is performed with regard to an identified set of nodes in the Deployment dialog 1200. Similarly, status of currently executing deployment is calculated based upon an expected initiated deployment operation and the current status of the deployment is generated during the execution of the initiated deployment procedure through similar status indicators on the nodes within the Objects To Be Processed pane 1008 in FIG. 11.

In an exemplary embodiment, such deployment status information is maintained in equipment control blocks (ECBs) for attached devices. Thus, a control module assembly maintains a set of ECBs corresponding to attached I/O module assemblies, and each I/O module assembly maintains a set of ECBs corresponding to connected field devices. Logic executed on the control module assemblies and I/O module assemblies tracks the status of deployment through status fields associated with the ECBs and reports status changes to a parent node in the cascaded deployment scheme (ending at a workstation including an executing program for providing a status interface such as the one depicted in FIGS. 11 and 12.

Executing Deployment

Figure 13:
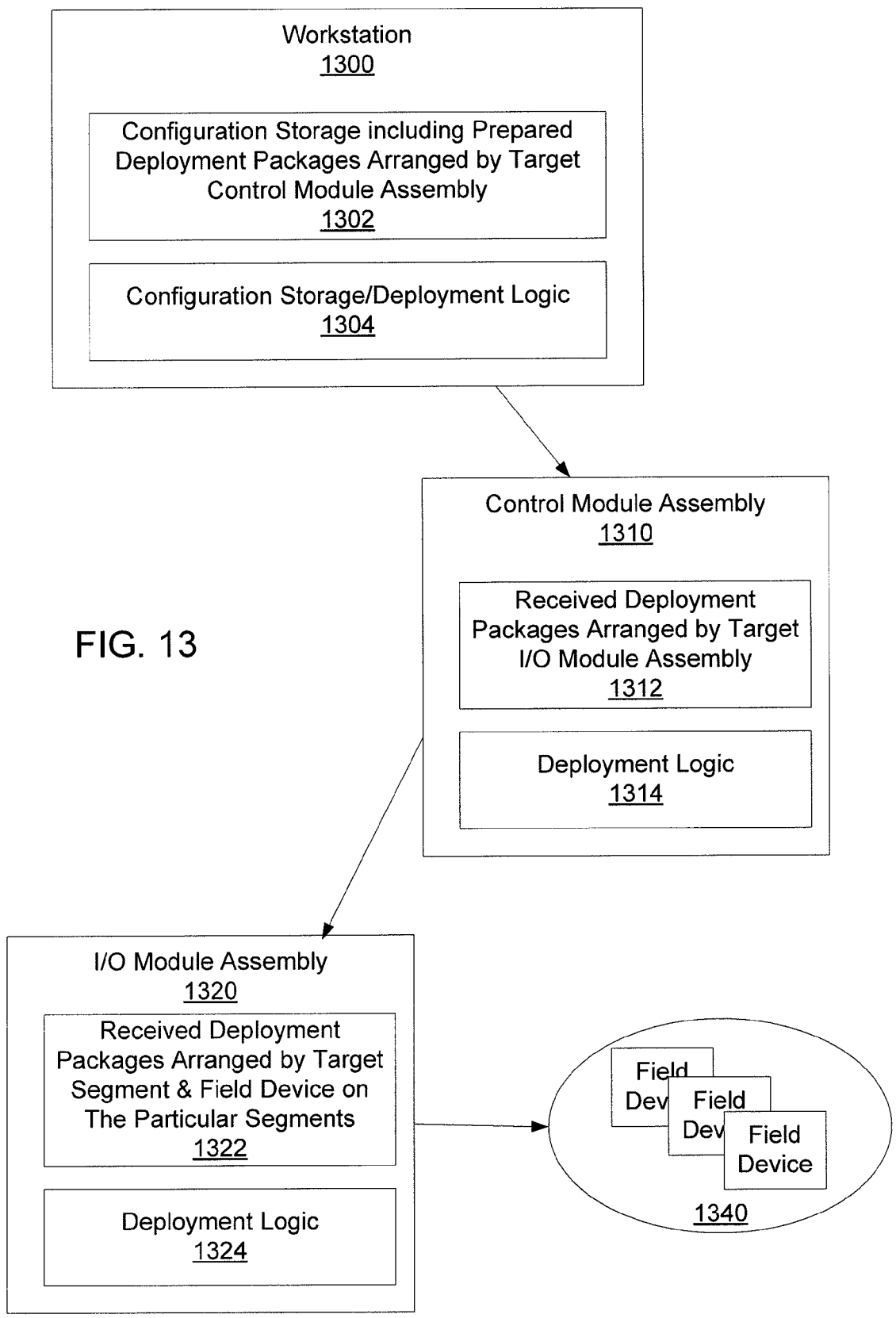
FIG. 13 is a schematic drawing depicting a set of components associated with a cascading configuration deployment scheme (simplified by reducing multiple instances of control module assemblies and fieldbus modules to enhance clarity)

Turning to FIG. 13, a schematic diagram illustratively depicts an exemplary arrangement of computer-executable instructions and data storage for carrying out an illustrative embodiment of the present invention. The logic and data structures identified in FIG. 13 are thereafter described with reference to exemplary procedures for carrying out the cascaded and parallel deployment of a defined configuration to a set of devices. It is specifically noted that while only a single instance of a control module assembly and I/O module assembly are provided in FIG. 13, in practice, multiple control module assemblies will receive deployment packages from a workstation. Each control module assembly is connected to multiple I/O module assemblies, and each I/O module assembly is connected to multiple segments. Each segment, in turn, contains multiple connected field devices.

In the illustrative example, a workstation 1300 comprises a configuration storage 1302 containing a set of deployment packages prepared by the workstation 1300 from a previously defined configuration of a process control system including, among other things, a set of function blocks. The configuration of a process control system includes potentially thousands of individual block deployment packages (see, e.g., the block deployment package 910) generated for each of potentially thousands of blocks to be deployed in potentially hundreds of field devices in a process control network. The deployment of the block deployment packages is performed in parallel by control module assemblies and I/O module assemblies (e.g., I/O module assembly 110) to expedite completion of the commissioning process.

The set of deployment packages are created when a user selects the Prepare All button 1009. In the exemplary embodiment the deployment packages are associated with a control strategy defining a set of function blocks (e.g., PID, Analog In (AI), Analog Out (AO), etc.) for a particular process control application. For each block in the control strategy, sufficient information is provided to identify a target (e.g., field device) that will execute the block, and a path for deploying the block to the target. For example, a block deployment package specifies a control module assembly, I/O module assembly, and device combination—the combination specifying an ultimate destination during deployment.

In an exemplary embodiment, the sets of packages are grouped within the configuration storage 1302 according to their intended target control module assembly at a first deployment level in a cascading deployment scheme. More particularly, the contents of the control module assembly deployment packages are grouped (and sub-grouped) according to identified destinations (e.g. field devices) as well as the path (intermediate control module assembly and I/O module assembly) for deploying a particular portion (e.g., a configured block) of the configuration to each identified destination. The path (and thus deployment package grouping) can be designated at the time of configuration or alternatively when the configuration is deployed in accordance with the current state of a process control network to which the configuration is to be deployed. Such state is maintained in a current "network configuration" stored on, for example, the workstation 102 and/or a shared networked data storage server. Moreover, the physical configuration of a workstation and/or associated servers that store configurations and/or deployment packages differs in various embodiments. In some cases the workstation and a network data storage server are two separate devices. In other instances a single machine operates as both the workstation and the network storage server.

The workstation 1300 also includes configuration storage/deployment logic 1304 that maintains the set of prepared deployment packages. Once a user initiates deployment on the workstation 1300, the logic 1304 is executed on the workstation 1300 to download deployment packages to a set of target control module assemblies without any further user intervention. In particular, the logic 1304 attempts to download portions of the prepared configuration (or designated portion thereof) to designated control module assemblies for which at least one deployment package is pending. Upon identifying an available target, the logic 1304 initiates establishing a connection with the target control module assembly and simultaneously maintains potentially multiple connections to multiple control module assemblies to facilitate parallel deployment. Upon establishing a connection, the logic 1304 commences downloading the deployment packages designated for download via the connected target control module assembly. The package deployment process occurs independently to each connected control module assembly. Thus, the unavailability of one control module assembly will not affect downloads to another, currently available, control module assembly. Moreover, after deployment, the deployment packages are maintained by the workstation 1300 and/or a shared configuration storage (not shown) accessible by potentially many workstations in case one or more of the packages need to be redeployed.

In the illustrative example, a control module assembly 1310 comprises a deployment package storage 1312 containing a set of deployment packages prepared by the workstation 1300 and passed down to the control module assembly when a user selected the deploy button 1020. In an exemplary embodiment, the sets of packages have information for identifying a target I/O module assembly at a second deployment level in the cascading deployment scheme (enabling grouping of the deployment packages). The contents of the deployment package store 1312 are persisted such that at least the most recently deployed version of a particular deployment package for an identified block is maintained, thereby facilitating redeployment on demand from an attached I/O module assembly without user intervention.

The control module assembly 1310 also executes deployment logic 1314 that maintains the set of received deployment packages. In an exemplary embodiment, the deployment logic 1314 is provided by the deployment packages themselves. In other embodiments, generalized deployment logic 1314 resides permanently on the control module assembly 1310. Once at least one deployment package is received and stored in the deployment package storage 1312 for deployment to a field device, the deployment logic 1314 executes on the control module assembly 1310 to download deployment packages to a set of target I/O module assemblies without any user intervention.

Moreover, the control module assembly operates as a temporary buffer in the event that deployment packages are received for an I/O module assembly that is currently not available (e.g., not attached, not operational, etc.). In particular, the logic 1314 controls scanned monitoring of the availability of each target I/O module assembly (for which at least one deployment package is pending). Upon detecting an available target, the logic initiates establishing a connection with the target I/O module assembly and simultaneously maintains potentially multiple connections to multiple I/O module assemblies to facilitate parallel deployment. Upon establishing a connection, the logic 1314 commences downloading the deployment packages designated for download via the connected target I/O module assembly. The package deployment process occurs independently to each connected I/O module assembly. Thus, the unavailability of one I/O module assembly will not affect downloads to another, currently available, I/O module assembly. Moreover, after deployment, the deployment packages are maintained by the control module assembly 1310 in case one or more of the packages need to be redeployed.

Similarly, an I/O module assembly 1320 comprises a deployment package storage 1322 containing a set of deployment packages prepared by the workstation 1300 and passed down to the I/O module assembly 1320 via the control module assembly 1310. In an exemplary embodiment, the sets of packages are grouped according to their intended target devices on specified segments at a third deployment level in the cascading deployment scheme. The contents of the deployment package store 1322 are persisted such that at least the most recently deployed version of a particular deployment package for an identified block is maintained, thereby facilitating redeployment on demand from an attached field device without user intervention.

The I/O module assembly 1320 also includes deployment logic 1324 that maintains the set of received deployment packages. Once at least one deployment package is received and stored in the deployment package storage 1322 for deployment to a field device, the deployment logic 1324 executes on the I/O module assembly 1320 to download deployment packages to a set of target field devices 1340 on one or more segments (e.g., an H1 fieldbus) without any user intervention. In an exemplary embodiment, the I/O module assembly 1320 deployment logic supports at least one write operation to each connected segment. However, the degree of parallelism (e.g., simultaneously pending writes) exhibited by the I/O module assembly 1320 when writing configuration data (e.g., block parameter) to attached field devices is determined by the individual capabilities of the connections (communications protocols) negotiated by the I/O module assembly and a connected field device. Such negotiation occurs, for example, when a connection is established prior to commencing downloads associated with a deployment package to be deployed to the connected field device.

With regard to parallelism exhibited during deployment, even in a most limited situation, an I/O module assembly has one pending write per connected segment. However, substantial time savings can exist in even this deployment arrangement in cases where multiple I/O module assemblies each comprise multiple connected segments. In other cases, field devices on a same segment negotiate a connection allowing a pending write operation to each field device on the same segment. In yet other examples, the field devices support multiple pending writes to a same device (e.g., one pending write per block on the field device).

Moreover, the I/O module assembly operates as a temporary buffer/archive (of most recent versions of deployment packages). The I/O module assembly operates as a buffer in the event that deployment packages are received for a field device that is currently not available (e.g., not attached, not operational, etc.). In particular, the logic 1324 controls scanned monitoring of the availability of each target field device (for which at least one deployment package is pending). Upon detecting an available target, the logic 1324 initiates establishing a connection with the field device and simultaneously maintains potentially multiple connections to multiple field devices on multiple segments to facilitate parallel deployment. Upon establishing a connection, the logic 1324 commences downloading the deployment packages designated for download to the field device. The package deployment process occurs independently to each connected I/O module assembly. Thus, the unavailability of one I/O module assembly will not affect downloads to another, currently available, I/O module assembly. Moreover, after deployment, the deployment packages are maintained by the I/O module assembly 1310 in case one or more of the packages need to be redeployed.

Figure 14:
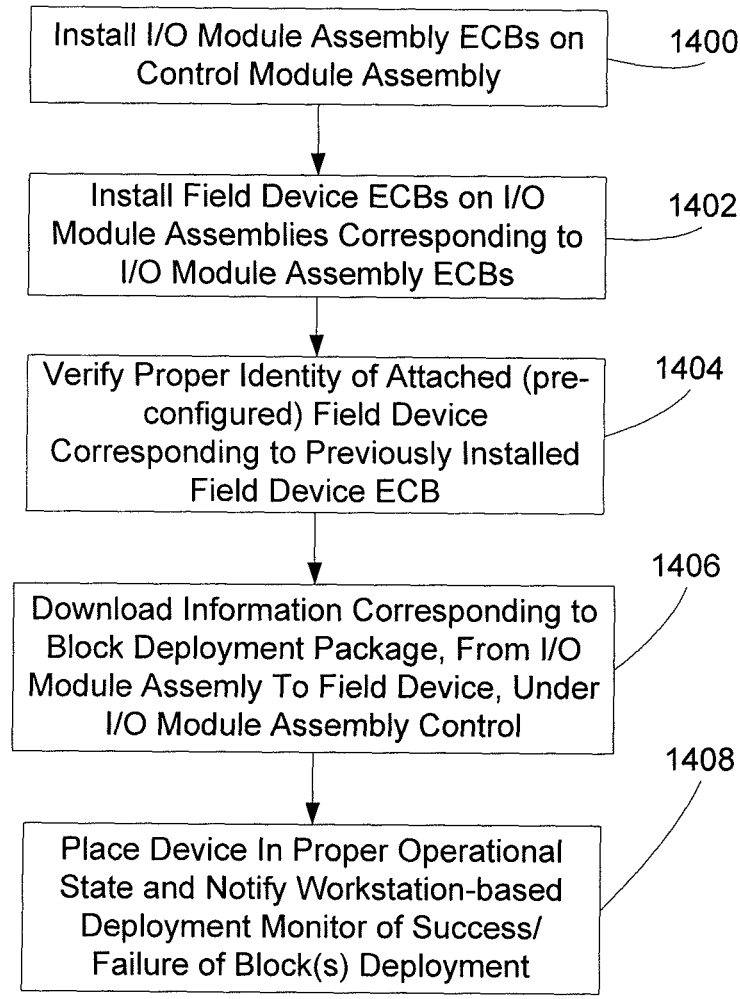
FIG. 14 is a flowchart including a set of steps summarizing a progression which ultimately results in deployment of a configured block, in a buffered/cascading manner, to a field device, with potentially one or more buffered delays at intermediate levels of the cascaded deployment scheme in accordance with the relationships between participating components of a cascaded deployment scheme described with reference to FIG. 13.

Turning to FIG. 14, an exemplary set of stages summarize the general set of operations performed for carrying out an automated block deployment procedure that is guided by the content of a configuration created by a configuration tool program executed by a workstation computer such as the one described herein above with reference to FIGS. 2-6. While the example is performed with reference to a program, the scope of deployment can be any of a number of deployable configuration components including instruction/command scripts, executable code, data, etc.

Before the blocks of a configuration can be deployed to field devices, the control module assemblies (e.g., control module assembly 108) and I/O module assemblies (e.g., I/O module assembly 110) must be properly configured/programmed to handle the deployment. Therefore, during step 1400 at least one I/O module assembly is deployed and enabled on a control module assembly containing at least a portion of a configuration containing a set of blocks to be deployed to attached field devices. By way of example, equipment control blocks (ECBs) provide control module assemblies the ability to communicate with I/O module assemblies and their connected field devices. The ECBs define, for the parent node, the operation of particular networked devices (e.g., an I/O module assembly, a field device, etc.). Therefore deployment of an I/O module assembly ECB enables a user to access H1 segments and field devices connected to the I/O module assembly corresponding to the ECB. After the ECB for the I/O module assembly is installed, the I/O module assembly type is verified and the health of the I/O module assembly is continuously checked by the parent control module assembly using the ECB. Furthermore, when the I/O module assembly ECB is deployed and enabled on the control module assembly, communication between the control module assembly and the I/O module assembly is established.

From this point the I/O module assembly commences continuously scanning its configured set of H1 segments for connected FF devices in accordance with a currently specified configuration established by a set of installed field device ECBs.

Therefore, in an illustrative embodiment, during step 1402, field device ECBs are installed on the I/O module assembly(ies) for which an I/O module assembly ECB was previously installed on a control module assembly during step 1400. Each field device ECB corresponds to a field device (to be) connected to the I/O module assembly.

The steps that follow describe an exemplary set of operations for enabling an attached field device corresponding to an installed field device ECB on an I/O module assembly and deploying one or more blocks to the field device in accordance with the last tier of the cascaded deployment package procedure described herein above with reference to FIG. 13.

During step 1404, when field devices corresponding to installed field device ECBs are attached to the I/O module assemblies, the I/O module assemblies (after negotiating a connection with the attached device) communicate with the field devices to initially verify the identify of the field devices. In an exemplary embodiment, the identity is verified by matching a unique device name (tag) provided in a field device ECB to one provided by the new attached field device. Additional information from a device description file on the new field device is also compared (to configuration information provided by the field device ECB) including: device manufacturer, device type, version/revision number.

In the case where a deployed configuration contains blocks to be deployed on an attached (and verified) field device, as part of a final tier of the configuration deployment scheme, the deployed blocks are deployed on the field devices. The deployed blocks are potentially ones that have been deployed prior to attachment of the field device to the I/O module assembly. In such case, the I/O module assembly buffers/maintains the block deployment package for the device while awaiting attachment of the field device. Moreover, the block deployment package is archived/persisted on the I/O module assembly in case a need arises for redeployment.

Thus, after verifying that a proper field device has been attached during step 1404, during step 1406 the I/O module carries out installing a configured block that has been deployed to the I/O module assembly in association with a configuration deployment initiated, in a first instance, by a user at a workstation and carried out automatically according to the procedure and structures described herein above. During step 1406, for each parameter in the deployed block configuration assigned to the field device, the I/O module assembly:

(a) Executes the Pre steps—e.g. Sets the mode (if specified in the block deployment package);

(b) Sets the block parameter value in the field device; and (c) Executes the post steps—e.g. Waits pre-defined time (if specified for the parameter) before initiating a next write operation to the field device.

A deployed block can be either a totally new block or a replacement for a previously deployed block. Therefore, in an exemplary embodiment, the I/O module assembly performs the following particular operations during block deployment to an attached field device. The I/O module assembly (e.g., FBM) compares the newly deployed block with a listing of information for blocks previously deployed to the connected fieldbus devices to determine whether the deployed block is associated with a new deployment or a modification of an already deployed block.

During (re)deployment, the status of the block is initially set to indicate that it is being deployed, thereafter, the I/O module assembly determines, during step 1406 whether:

a. in the case of redeployment, any block parameter values have changed and need to be written to the appropriate field device;

b. any block scheduling information is changed and the H1 segment schedule needs to be re-calculated;

c. any block connection information is changed, and new connections should be created and old connections should be removed.

During step 1406, the I/O module assembly writes the parameter values for a deployed block to a connected field device. In accordance with an exemplary embodiment, the writing of the parameter values occurs sequentially for a given block. However, if multiple blocks on the field device need to receive parameter values, then the I/O module assembly writes sequential values for the various blocks in parallel, thereby reducing the time for commissioning function blocks to field devices by potentially multiple orders of magnitude (depending on the level of parallelism that can be exploited during the commissioning process).

Moreover, in accordance with an exemplary embodiment, when a block is deployed within a device (e.g., a field device) within which it will eventually operate, the block is initially set to a non-operational state. The non-operational state is intended to be used while other blocks are being deployed. While in the non-operational state, the block monitors whether the block can enter an operational state. In an exemplary embodiment, a signal is issued via a connected I/O module assembly to connected devices that the blocks can enter the operational state (e.g., the deployment operation was successful across the system or a portion thereof). If deployment is not successful, the blocks will continue to reside in the non-operational state. Thus, in accordance with an embodiment of the invention, both deployment and subsequent "activation" of a configuration can occur across an entire system in a cascaded and parallel manner.

During a commissioning step 1408, potentially performed in parallel with step 1406 (as opposed to in series as shown in the flowchart), the I/O module assembly collects all the information for the deployed block configuration and updates overall block device status to indicate to a parent control module assembly either: (1) the deployment of the block configuration was successful or (2) an error was detected during the attempt to deploy the block to the field device. If, during step 1406, the download of the parameters from the I/O module assembly to the field device for a deployed block fails, then during step 1408 the I/O module assembly indicates the error for the field device (to its host control module assembly) and switches back to a state where it will wait for a next deployment from the control module assembly to resolve issues arising from the previous deployment attempt. Deployment of schedule-related parameters and links between blocks is not performed and the field device and the failed blocks are excluded from the control strategy.

Block deployment errors are marked in the field device and/or in each block in the field device where deployment has failed. In an exemplary embodiment, such errors automatically pass up through the connected I/O module assembly and control module assembly to the workstation (e.g., workstation 102) that initiated the block deployment. Thus, a user is provided an enumeration of block deployment failures for review (see, FIG. 10, Object Preparation Result pane 1011) and taking corrective action before initiating a follow-up remedial block deployment.

If, during step 1406, the block deployment operation to a connected fieldbus device is successful, then during step 1408 the block and device containing the block is set to be executed on the field device for carrying out a control application. If the fieldbus device is not enabled for control, the fieldbus device stays in the disabled state until control is enabled or until a new set of parameters are re-deployed to the fieldbus device for the previous block for which commissioning failed. More broadly, with regard to a fieldbus device that has received multiple function blocks during deployment, if the fieldbus device or its blocks are redeployed, the fieldbus device is switched to a "device matching" state and the procedure for deployment/commissioning function blocks to the fieldbus device starts again.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software, stored on, for example, non-transitory/physical (e.g., a hard disk, removable disc, a thumb drive, etc.) computer-readable media (or alternatively a non-physical computer readable media) in the form of computer executable instructions, may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for deploying a set of deployment packages, corresponding to a configuration for a process control system, to a set of connected field devices, the method comprising the steps of:

storing the set of deployment packages within a configuration storage;

initiating deployment of the set of deployment packages from the configuration storage;

in response to the initiating deployment step, commencing an automated cascaded deployment of the set of deployment packages to the set of connected field devices, the cascaded deployment comprising the substeps of:

first deploying the sets of deployment packages to a set of control module assemblies;

first maintaining, by the set of control module assemblies, received portions of the set of deployment packages to facilitate distribution of the received portions of the set of deployment packages to identified field devices of the set of connected field devices;

second deploying, by the set of control module assemblies, the received portions of the set of deployment packages in parallel to a set of I/O module assemblies, the I/O module assemblies being communicatively connected to a set of field devices, wherein the received portions of the set of deployment packages deployed to the I/O module assemblies comprise sub-portions of the set of deployment packages;

second maintaining, by the set of I/O module assemblies, the received sub-portions of the set of deployment packages to facilitate forwarding of the received sub-portions of the set of deployment packages to the communicatively connected set of field devices; and third deploying, by the set of I/O module assemblies, the received sub-portions of the set of deployment packages to the communicatively connected set of field devices, the received sub-portions entering an operational state from a non-operational state upon receiving a notification to leave the non-operational state, the notification being automatically propagated in a cascaded manner via the set of I/O module assemblies to the received sub-portions;

upon deploying the deployment package to the set of field devices, continuously scanning by the I/O module assemblies to detect the target field device for the deployment package, wherein the set of I/O module assemblies include scanning logic; and downloading information associated with the deployment package to the detected target field device in response to the scanning.

2. The method of claim 1 wherein the field devices are Foundation Fieldbus devices.

3. The method of claim 1 wherein the deployment package corresponds to a device block.

4. The method of claim 3 wherein the device block is a function block.

5. The method of claim 1 further comprising buffering the deployment package in a persisting storage in response to a failure to detect the presence of the target field device for the deployment package.

6. The method of claim 1 wherein the first maintaining step comprises persisting received portions of the set of deployment packages after performing the second deploying step; and re-deploying, by a control module assembly to an I/O module assembly, a deployment package to an I/O module assembly based upon a persisted one of the received portions of the set of deployment packages.

7. The method of claim 1 wherein the second maintaining step comprises persisting received sub-portions of the set of deployment packages after performing the third deploying step; and re-deploying, by an I/O module assembly to a field device, a deployment package to a field device based upon a persisted one of the received sub-portions of the set of deployment packages.

8. The method of claim 1 further comprising the step of:

providing a deployment status notification from the target field device to at least one of the set of I/O module assemblies and the set of control module assemblies, which are interposed between a configuration source and the target field device.

9. The method of claim 8 further comprising the step of:

providing a current status of a deployment operation on a display, the display including a user interface having a hierarchically arranged set of nodes in a collapsible tree representing at least a portion of the configuration of the process control system.

10. The method of claim 1 further comprising identifying a cascading deployment path through an identified control module assembly, I/O module assembly, and field device.

11. The method of claim 1 further comprising:

initially placing the received sub-portions in a non-operational state on the field devices; and monitoring whether the received sub-portions can enter an operational state on the field devices.

12. A non-transitory computer-readable medium storing computer-executable instructions that when executed on a computer system facilitate deploying a set of deployment packages to a set of connected field devices for configuring a process control system, the set of deployment packages corresponding to a configuration for the process control system, the stored computer-executable instructions comprising:

instructions for storing the set of deployment packages within a configuration storage;

instructions for initiating deployment of the set of deployment packages from the configuration storage;

instructions for commencing an automated cascaded deployment of the set of deployment packages to the set of connected field devices in response to the initiating deployment, the automated cascaded deployment to the set of connected field devices comprising:

first instructions for deploying the sets of deployment packages to a set of control module assemblies;

first instructions for maintaining, by the set of control module assemblies, received portions of the set of deployment packages to facilitate distribution of the received portions of the set of deployment packages to identified field devices of the set of connected field devices;

second instructions for deploying, by the set of control module assemblies, the received portions of the set of deployment packages in parallel to a set of I/O module assemblies, the I/O module assemblies being communicatively connected to a set of field devices, wherein the received portions of the set of deployment packages deployed to the I/O module assemblies comprise sub-portions of the set of deployment packages;

second instructions for maintaining, by the set of I/O module assemblies, the received sub-portions of the set of deployment packages to facilitate forwarding of the received sub-portions of the set of deployment packages to the communicatively connected set of field devices; and third instructions for deploying, by the set of I/O module assemblies, the received sub-portions of the set of deployment packages to the communicatively connected set of field devices, the received sub-portions entering an operational state from a non-operational state upon receiving a notification to leave the non-operational state, the notification being automatically propagated in a cascaded manner via the set of I/O module assemblies to the received sub-portions;

instructions for continuously scanning, by the I/O module assemblies, to detect the target field device for the deployment package, wherein the set of I/O module assemblies include scanning logic; and instructions for downloading information associated with the deployment package to the target field device in response to the scanning.

13. The computer-readable medium of claim 12 wherein the computer-executable instructions include instructions for buffering the deployment package in a persisting storage in response to a failure to detect the presence of the target field device for the deployment package.

14. The computer-readable medium of claim 12 wherein the second instructions for maintaining comprise computer-executable instructions for:

persisting received sub-portions of the set of deployment packages after performing the third deploying; and re-deploying, by an I/O module assembly to a field device, a deployment package to a field device based upon a persisted one of the received sub-portions of the set of deployment packages.

15. The computer-readable medium of claim 12 further comprising computer executable instructions for:

providing a deployment status notification from the target field device to at least one of the set of I/O module assemblies and the set of control module assemblies, which are interposed between a configuration source and the target field device.

16. The computer-readable medium of claim 14 further comprising computer-executable instructions for:
providing a current status of a deployment operation on a display, the display including a user interface; and
providing on the user interface a hierarchically arranged set of nodes in a collapsible tree representing at least a portion of the configuration of the process control system.

17. The computer-readable medium of claim 12 further comprising computer executable instructions for:
initially placing the received sub-portions in a non-operational state on the field devices; and
monitoring whether the received sub-portions can enter an operational state.

18. A networked process control system that supports deploying, in a cascaded parallel manner, a set of deployment packages to a set of connected field devices, the set of deployment packages corresponding to a configuration for a process control system, the networked process control system comprising:
a control station located at a top level of a cascaded deployment path to the set of connected field devices, the control station including a configuration storage and executable procedures, for:
storing the set of deployment packages within the configuration storage,
initiating an automated cascaded deployment of the set of deployment packages from the configuration storage in a parallel manner, and
first deploying, at a top tier of the cascaded deployment path to the field devices, the sets of deployment packages;
a control module assembly located at a second level of the cascaded deployment path, the sets of deployment packages being deployed by the control station to the control module assembly, the control module assembly including a first deployment storage and first deployment logic for:
first maintaining, by the control module assembly, received portions of the set of deployment packages to facilitate distribution of the received portions of the set of deployment packages to identified field devices, and
second deploying, in parallel with other ones of control module assemblies, the received portions of the set of deployment packages;
an I/O module assembly communicatively connected to a set of field devices and located at a third level of the cascaded deployment path, the received portions of the set of deployment packages being deployed by the control module assembly to the I/O module assembly and comprising sub-portions of the set of deployment packages, the I/O module assembly being communicatively connected to the set of field devices and including a second deployment storage and second deployment logic for:
second maintaining, by the I/O module-assembly, the received sub-portions of the set of deployment packages to facilitate forwarding of the received sub-portions of the set of deployment packages to the communicatively connected set of field devices, and
third deploying, by the I/O module assembly, the received sub-portions of the set of deployment packages to the communicatively connected set of field devices, the received sub-portions entering an operational state from a non-operational state upon receiving a notification to leave the non-operational state, the notification being automatically propagated in a cascaded manner via the I/O module assembly to the received sub-portions;
continuously scanning, by the I/O module assemblies, to detect the target field device for the deployment package, wherein the set of I/O module assemblies include scanning logic; and
downloading information associated with the deployment package to the target field device in response to determining the target field device by the scanning.

19. A method for deploying a set of deployment packages, corresponding to a configuration for a process control system, to a set of connected field devices, the method comprising:
storing the set of deployment packages within a configuration storage;
initiating deployment of the set of deployment packages from the configuration storage;
in response to the initiating deployment step, commencing an automated cascaded deployment of the set of deployment packages to the set of connected field devices comprising the substeps of:
first deploying the sets of deployment packages, to a set of control module assemblies;
first maintaining, by the set of control module assemblies, received portions of the set of deployment packages to facilitate distribution of the received portions of the set of deployment packages to identified field devices;
second deploying, by the control module assemblies via a set of I/O module assemblies, the received portions of the set of deployment packages in parallel to the identified field devices, the received portions entering an operational state from a non-operational state upon receiving a notification to leave the non-operational state, the notification being automatically propagated;
continuously scanning, by the I/O module assemblies, to detect the target field device for the deployment package, wherein the set of I/O module assemblies include scanning logic; and
downloading information associated with the deployment package to the target field device in response determining the detected target field device by the scanning.

* * * * *